United States Patent
Hara et al.

(10) Patent No.: US 10,370,554 B2
(45) Date of Patent: *Aug. 6, 2019

(54) COATED METAL SHEET, METHOD FOR PRODUCING SAME, AND EXTERIOR BUILDING MATERIAL

(71) Applicant: NISSHIN STEEL CO., LTD., Tokyo (JP)

(72) Inventors: Taketo Hara, Chiba (JP); Koichiro Ueda, Chiba (JP); Kenji Sakato, Chiba (JP); Hiroki Yamaguchi, Chiba (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 15/503,185

(22) PCT Filed: Dec. 16, 2014

(86) PCT No.: PCT/JP2014/006275
§ 371 (c)(1),
(2) Date: Feb. 10, 2017

(87) PCT Pub. No.: WO2016/024306
PCT Pub. Date: Feb. 18, 2016

(65) Prior Publication Data
US 2017/0226366 A1    Aug. 10, 2017

(30) Foreign Application Priority Data

Aug. 12, 2014 (JP) ................ 2014-164265

(51) Int. Cl.
| | | |
|---|---|---|
| *B05D 3/10* | (2006.01) | |
| *B05D 5/02* | (2006.01) | |
| *B05D 5/06* | (2006.01) | |
| *B05D 7/14* | (2006.01) | |
| *B05D 7/24* | (2006.01) | |
| *C09D 5/08* | (2006.01) | |
| *C09D 5/28* | (2006.01) | |
| *C09D 7/40* | (2018.01) | |
| *C09D 7/42* | (2018.01) | |
| *E04C 2/08* | (2006.01) | |
| *B32B 15/08* | (2006.01) | |
| *C23C 22/05* | (2006.01) | |
| *B32B 15/082* | (2006.01) | |
| *C09D 127/12* | (2006.01) | |
| *C09D 127/16* | (2006.01) | |

(52) U.S. Cl.
CPC .......... *C09D 127/16* (2013.01); *B05D 3/108* (2013.01); *B05D 5/02* (2013.01); *B05D 5/06* (2013.01); *B05D 7/14* (2013.01); *B05D 7/24* (2013.01); *B32B 15/08* (2013.01); *B32B 15/082* (2013.01); *C09D 5/08* (2013.01); *C09D 5/28* (2013.01); *C09D 7/40* (2018.01); *C09D 7/42* (2018.01); *C09D 127/12* (2013.01); *C23C 22/05* (2013.01); *E04C 2/08* (2013.01); *E04B 2103/06* (2013.01)

(58) Field of Classification Search
CPC ......... B32B 15/082; B32B 15/08; E04C 2/08; C09D 127/16
See application file for complete search history.

(56) References Cited

U.S. PATENT DOCUMENTS

| | | | | |
|---|---|---|---|---|
| 10,077,367 | B2 * | 9/2018 | Hara | ................. C09D 7/61 |
| 10,174,426 | B2 * | 1/2019 | Hara | ................. B05D 7/14 |
| 2017/0218519 | A1 * | 8/2017 | Hara | ................. B05D 7/14 |
| 2017/0226645 | A1 * | 8/2017 | Hara | ................. C23C 24/082 |

FOREIGN PATENT DOCUMENTS

| | | |
|---|---|---|
| JP | H05-220449 A | 8/1993 |
| JP | H07-276561 A | 10/1995 |
| JP | H11-156999 A | 6/1999 |
| JP | 2004-154993 A | 6/2004 |
| JP | 2007-007562 A | 1/2007 |
| JP | 2011-148107 A | 8/2011 |
| JP | 2012-214010 A | 11/2012 |
| WO | 2012/029977 A1 | 3/2012 |

OTHER PUBLICATIONS

International Search Report from International Application No. PCT/JP2014/006275 dated Jan. 20, 2015.

* cited by examiner

*Primary Examiner* — Hai Vo
(74) *Attorney, Agent, or Firm* — Brundidge & Stanger, P.C.

(57) ABSTRACT

This coated metal sheet for exterior covering has a metal sheet and a top coating layer disposed on the metal sheet, the top coating layer is configured from a fluororesin and contains a gloss control agent comprising 0.01-15 vol % of microporous particles and a matte agent comprising primary particles, and the coated metal sheet satisfies the belowmentioned formulae. In the number-based particle size distribution of the gloss control agent and the matte agent, R is the number average particle size (μm) of the gloss control agent, $D1_{97.5}$ and $D2_{97.5}$ represent the 97.5% particle size (μm) of the gloss control agent and the matte agent, Ru is the upper limit particle size (μm) of the gloss control agent, and T is the top coating layer thickness (μm).

$D1_{97.5}/T \leq 0.9$ $Ru \leq 1.2T$ $R \geq 1.0$ $0.5 \leq D2_{97.5}/T \leq 7.0$ $3 \leq T \leq 40$.

13 Claims, 9 Drawing Sheets

100 μm

COATED METAL SHEET, METHOD FOR PRODUCING SAME, AND EXTERIOR BUILDING MATERIAL

TECHNICAL FIELD

The present invention relates to a coated metal sheet for exterior use, a production method therefor, and an exterior building material.

BACKGROUND ART

Coated metal sheets, excellent in versatility, designability, durability and the like, have been used in various applications. In coated metal sheets for exterior building material applications, mainly from the viewpoint of designability, a gloss adjusting agent is usually blended in an overcoat coating film which is a surface of the coated metal sheet surface. Silica particles are usually used as the gloss adjusting agent in the coated metal sheets for exterior building materials. The particle diameter of the silica particles is usually specified by an average particle diameter. The average particle diameter of the silica particles as the gloss adjusting agent in the coated metal sheet is usually from 3 to 30 μm, depending on the color and the application (for example, see PTL 1 (paragraph 0018)). Additionally, in order to provide the coating film with unevenness to thereby provide the appearance and texture of a so-called "matte coated steel sheet", it is necessary to further add a matting agent having a particle diameter larger than that of the gloss adjusting agent. Examples of the type of the matting agent include glass beads, resin beads and the like. The average particle diameter of the matting agent is usually from 10 to 50 μm (for example, see PTL 2 (paragraph 0016)).

CITATION LIST

Patent Literature

PTL 1
Japanese Patent Application Laid-Open No. 2011-148107
PTL 2
Japanese Patent Application Laid-Open No. 2004-154993

SUMMARY OF INVENTION

Technical Problem

As coated metal sheets for exterior building materials, chromate-coated steel sheets are used. Efforts have been made to improve the molding processability or the corrosion resistance at cut ends for the chromate-coated steel sheets, which thus have had long-term durability. Meanwhile, strong interest has been shown to environmental preservation in recent years also in the technical field of exterior building materials. Accordingly, legal regulations to ban the use of components that adversely affect or cause a concern about possibility of adversely affecting the environment have been under consideration. For example, restriction of the use of hexavalent chromium components, generally used in coated metal sheets as an anti-rust component, in the near future is under consideration. Also for chromate-free coated steel sheets, various considerations have been made such as pre-coating treatment, optimization of anti-rust pigments and the like, and characteristics obtained at molding processed portions and cut ends are comparable to those of the chromate-coated steel sheets.

However, the corrosion resistance of the flat portion in chromate-coated steel sheets did not lead to a large problem, while corrosion in the flat portion in chromate-free coated steel sheets may become severe. Particularly when silica particles are used as the gloss adjusting agent, corrosion such as stain rust, coating film blistering and the like, in the flat portion has occurred during actual use in some cases, before the intended age of service, as shown in FIG. 1.

An object of the present invention is to provide a coated metal sheet and an exterior building material that have matte designability as well as, even being chromate-free, have excellent flat-portion corrosion resistance equivalent to or greater than that of coated metal sheets comprising a chromate anti-rust treated metal sheet.

Solution to Problem

The present inventors have intensively studied causes of the aforementioned corrosion in the flat portion. FIG. 2 is a micrograph of a corroded portion in the flat portion of a chromate-free coated metal sheet. In FIG. 2, portion A is a portion where silica particles as a gloss adjusting agent are exposed from the overcoat coating film, and portion B is a portion where the silica particles have fallen off from the overcoat coating film. FIG. 3 is a reflection electron micrograph of a cross section along line L, in FIG. 2, in portion A of the coated metal sheet. FIG. 4 is a reflection electron micrograph of a cross section along line L, in FIG. 2, in portion B of the coated metal sheet. FIG. 3 clearly shows the occurrence of cracks at the silica particles exposed on the surface of the overcoat coating film, and FIG. 4 clearly shows that corrosion of the metal sheet originates from the holes in the overcoat coating film from which the silica particles have fallen off.

As described above, the present inventors have confirmed that, when particles having micropores such as silica are used as the gloss adjusting agent, the corrosion occurs in a portion where the gloss adjusting agent in the overcoat coating film has cracked, collapsed, or fallen off, and also that the gloss adjusting agent exposed from the overcoat coating film to be worn in actual use cracks, collapses and falls off from the overcoat coating film.

The present inventors have also investigated the gloss adjusting agent to thereby confirm that the silica particles specified by an average particle diameter contain particles considerably larger than the average particle diameter relative to the thickness of the overcoat coating film. For example, when observing, among commercially available silica particles to be used as the gloss adjusting agent, silica particles having an average particle diameter of 3.3 μm with an electron microscope, the present inventors have confirmed that silica particles having a particle diameter of about 15 μm are contained (FIG. 5). Additionally, the present inventors have observed the surface of the silica particles (portion B in FIG. 6A) and have confirmed that numberless minute gaps, which are specific to aggregated particles, are open to the surface (FIG. 6B).

Furthermore, the present inventors have confirmed that abrasion of the overcoat coating film and falling-off of the gloss adjusting agent similarly as aforementioned occur even in an overcoat coating film composed of fluorine resin, which has generally excellent weatherability (FIGS. 7A and 7B) although the phenomena are milder than those in an overcoat coating film composed of ordinary resin such as polyester. In FIG. 7A, the holes formed in the overcoat coating film are shown as black points. The holes have resulted from falling-off of the gloss adjusting agent from the overcoat coating film as shown in FIG. 7B.

Similarly when aggregated particles such as silica, polyacrylonitrile (PAN) and the like are used as a matting agent to be additionally used in the overcoat coating film, the present inventors have also confirmed that corrosion originates in a portion where the matting agent exposed from the overcoat coating film has cracked, collapsed, or fallen off (FIG. 8 and FIG. 9).

Then, the present inventors, focusing on the fact that such aggregated particles having a large particle diameter decrease the corrosion resistance, have found that, by use of a gloss adjusting agent having a specific particle diameter relative to the thickness of the overcoat coating film and a matting agent, corrosion resistance can be obtained equivalent to or greater than the corrosion resistance achieved by chromate-based chemical conversion treatment and by use of a chromium-containing anti-rust pigment in an undercoat coating film in conventional metal sheets, having completed the present invention.

Thus, the present invention relates to a coated metal sheet and an exterior building material below.

[1] A coated metal sheet including: a metal sheet, and an overcoat coating film disposed on the metal sheet, in which the overcoat coating film is composed of fluorine resin, and the overcoat coating film comprises a gloss adjusting agent which is particles having micropores and a matting agent which is primary particles, in which a content of the gloss adjusting agent in the overcoat coating film is from 0.01 to 15 vol %, in which a content of the matting agent in the overcoat coating film is from 0.01 to 15 vol %, and in which the coated metal sheet satisfies the following equations:

$D1_{97.5}/T \leq 0.9$ $Ru \leq 1.2T$ $R \geq 1.0$ $0.5 \leq D2_{97.5}/T \leq 7.0$ $3 \leq T \leq 40$ in which R (μm) is a number average particle diameter of the gloss adjusting agent, T (μm) is a film thickness of the overcoat coating film, $D1_{97.5}$ (μm) is a 97.5% particle diameter in an accumulated particle size distribution of the gloss adjusting agent based on the number of particles, $D2_{97.5}$ (μm) is a 97.5% particle diameter in an accumulated particle size distribution of the matting agent based on the number of particles, and Ru (μm) is an upper limit particle diameter in a number particle size distribution of the gloss adjusting agent.

[2] The coated metal sheet according to [1], in which the Ru is less than T.

[3] The coated metal sheet according to [1] or [2], in which the metal sheet has been subjected to non-chromate anti-rust treatment, and the coated metal sheet is chromate-free.

[4] The coated metal sheet according to [1] or [2], in which the metal sheet has been subjected to chromate anti-rust treatment.

[5] The coated metal sheet according to any one of [1] to [4], in which the gloss adjusting agent is silica particles.

[6] The coated metal sheet according to any one of [1] to [5], further including an undercoat coating film between the metal sheet and the overcoat coating film.

[7] The coated metal sheet according to [6], further including an intercoat coating film between the undercoat coating film and the overcoat coating film.

[8] The coated metal sheet according to any one of [1] to [7], in which the overcoat coating film is composed of a resin component, as the main component, comprising polyvinylidene fluoride and acrylic resin.

[9] The coated metal sheet according to in any one of [1] to [8], having a glossiness at 60° is 0.1 to 15.

[10] The coated metal sheet according to in any one of [1] to [9], being a coated metal sheet for exterior use.

[11] An exterior building material comprising the coated metal sheet according to any one of [1] to [9].

Also, the present invention relates to a method for producing a coated metal sheet below.

[12] A method for producing a coated metal sheet having a metal sheet and an overcoat coating film disposed on the metal sheet, including the steps of: applying an overcoat coating material containing a fluorine resin, a gloss adjusting agent, and a matting agent onto the metal sheet; and curing the coating film of the overcoat coating material to form the overcoat coating film; in which a content of the gloss adjusting agent in the overcoat coating film is from 0.01 to 15 vol %, and a content of the matting agent in the overcoat coating film is from 0.01 to 15 vol %, in which the gloss adjusting agent is particles having micropores, and the matting agent is primary particles, and in which the gloss adjusting agent and the matting agent which satisfy the following equations are employed:

$D1_{97.5}/T \leq 0.9$ $Ru \leq 1.2T$ $R \geq 1.0$ $0.5 \leq D2_{97.5}/T \leq 7.0$ $3 \leq T \leq 40$ in which R (μm) is a number average particle diameter of the gloss adjusting agent, T (μm) is a film thickness of the overcoat coating film, $D1_{97.5}$ (μm) is a 97.5% particle diameter in an accumulated particle size distribution of the gloss adjusting agent based on the number of particles, $D2_{97.5}$ (μm) is a 97.5% particle diameter in an accumulated particle size distribution of the matting agent based on the number of particles, and Ru (μm) is an upper limit particle diameter in a number particle size distribution of the gloss adjusting agent.

[13] The method for producing a coated metal sheet according to [12], in which the overcoat coating material has been subjected to treatment for pulverizing the particles in the overcoat coating material.

Advantageous Effects of Invention

The present invention prevents exposure, cracking and the like of the gloss adjusting agent, and cracking, fall-off and the like of the matting agent, at the intended age of service. As a result, there is provided a coated metal sheet that has intended matte designability having an adjusted gloss as well as, although being chromate-free, has excellent flat-portion corrosion resistance equivalent to or greater than that of coated metal sheets comprising a chromate anti-rust treated metal sheet.

DESCRIPTION OF EMBODIMENTS

Figure 1:
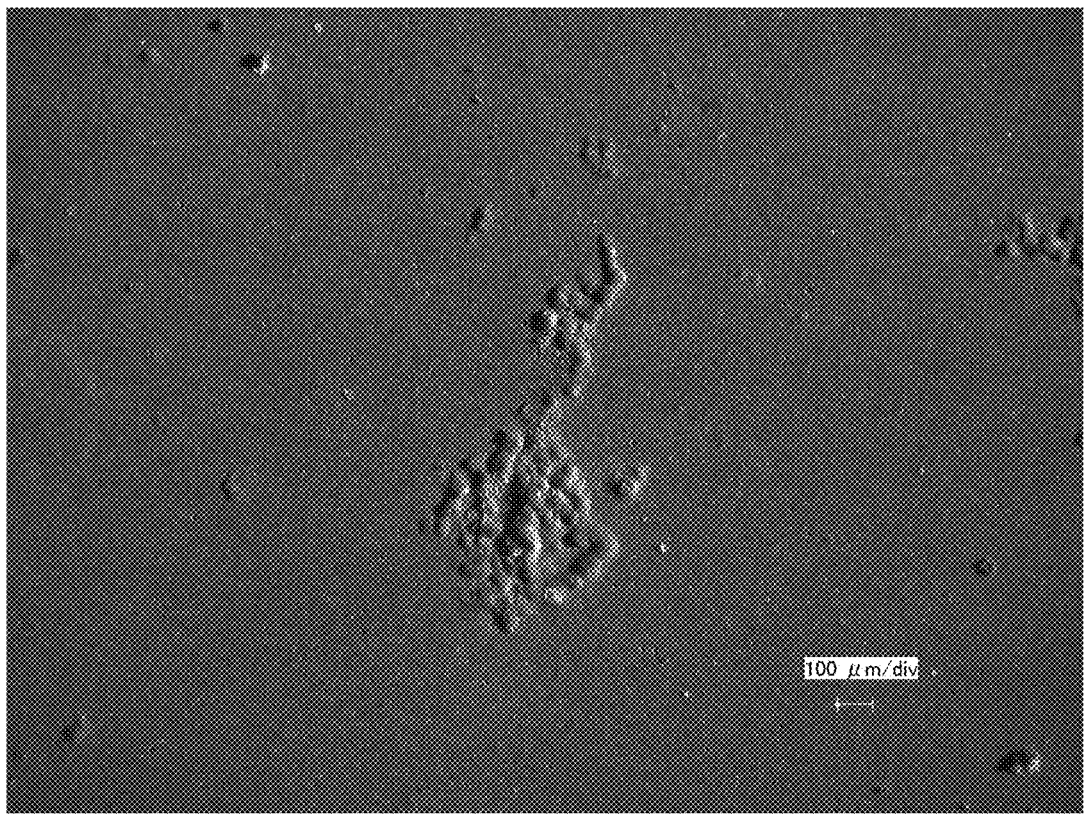
FIG. 1 is a micrograph of a corroded portion (coating film blistering) occurring in the flat portion of a chromate-free coated metal sheet in actual use of five years.
Figure 2:
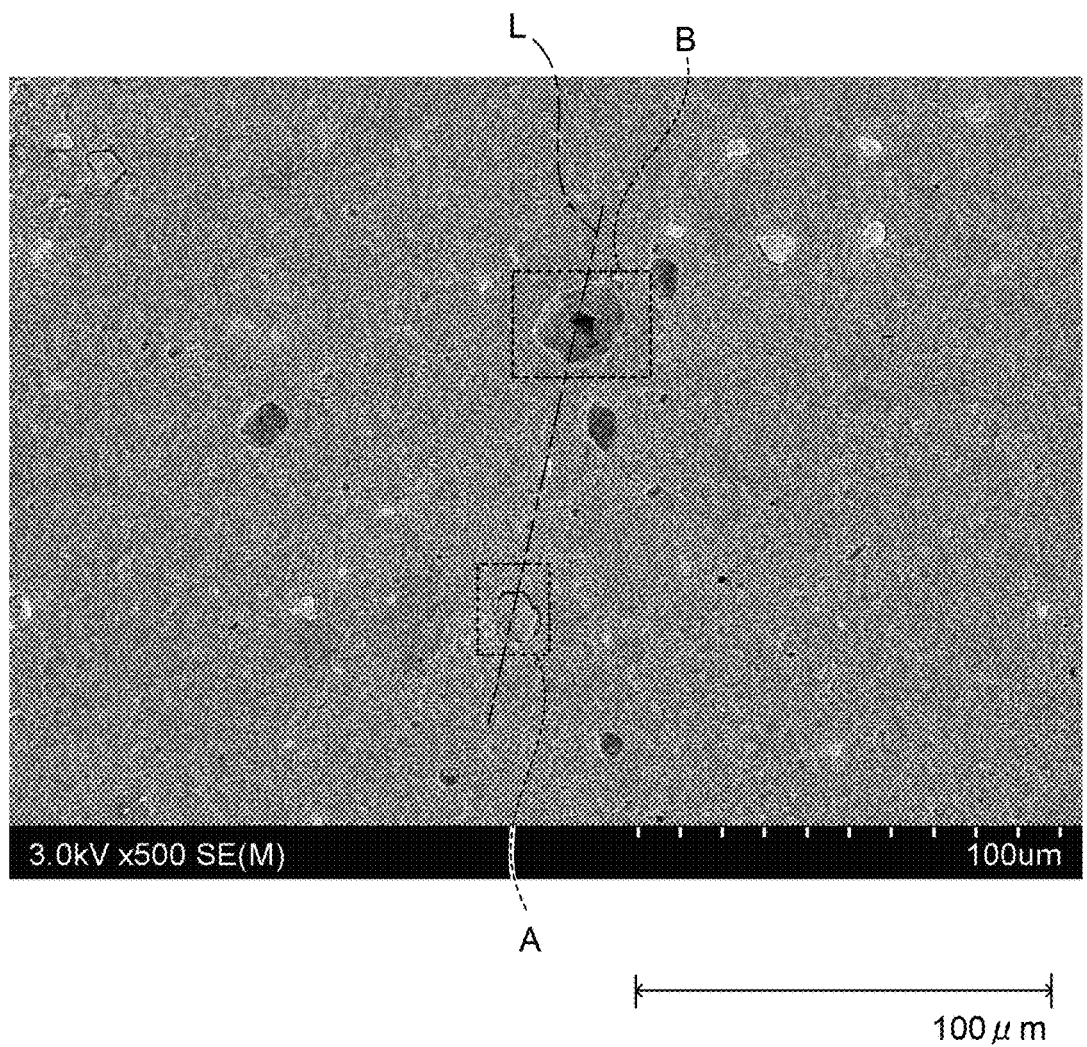
FIG. 2 is a micrograph of a corroded portion in the flat portion of the chromate-free coated metal sheet.
Figure 3:
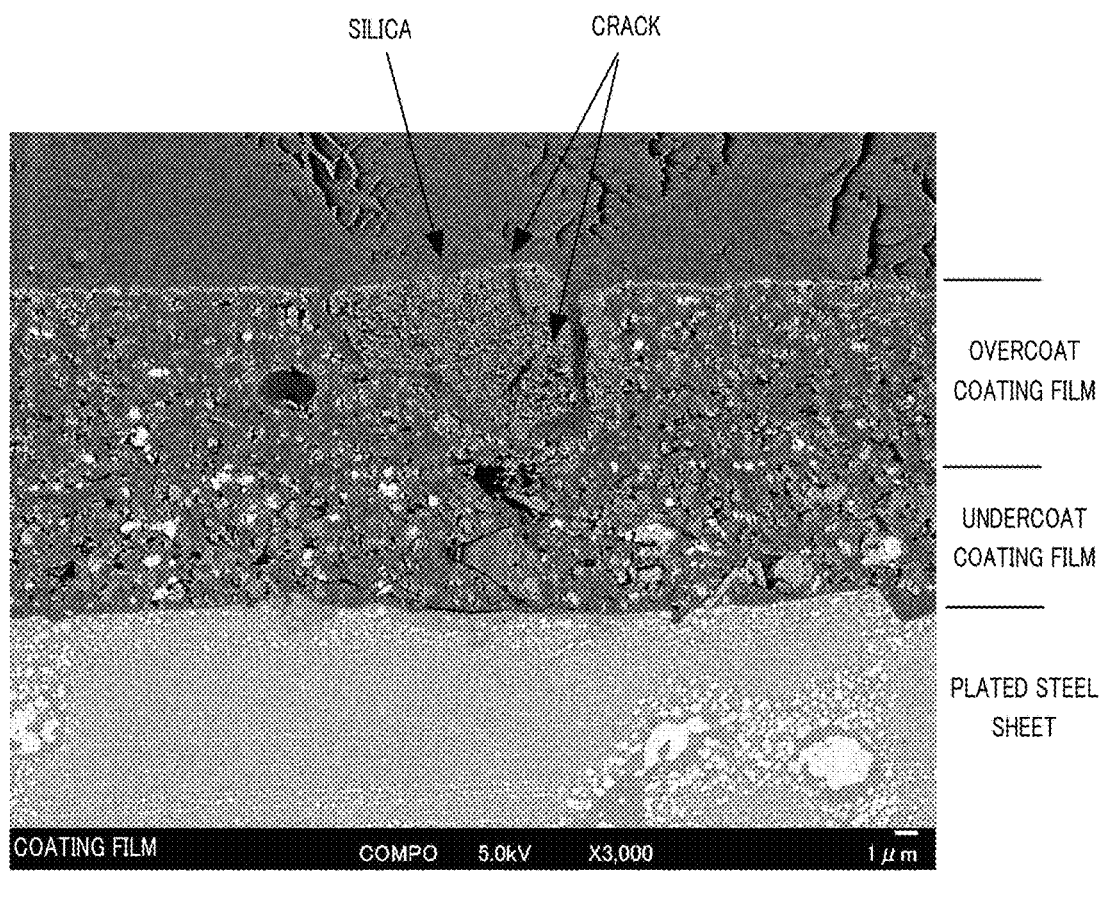
FIG. 3 is a reflection electron micrograph of a cross section along line L, in FIG. 2, in portion A of the coated metal sheet shown in FIG. 2.
Figure 4:
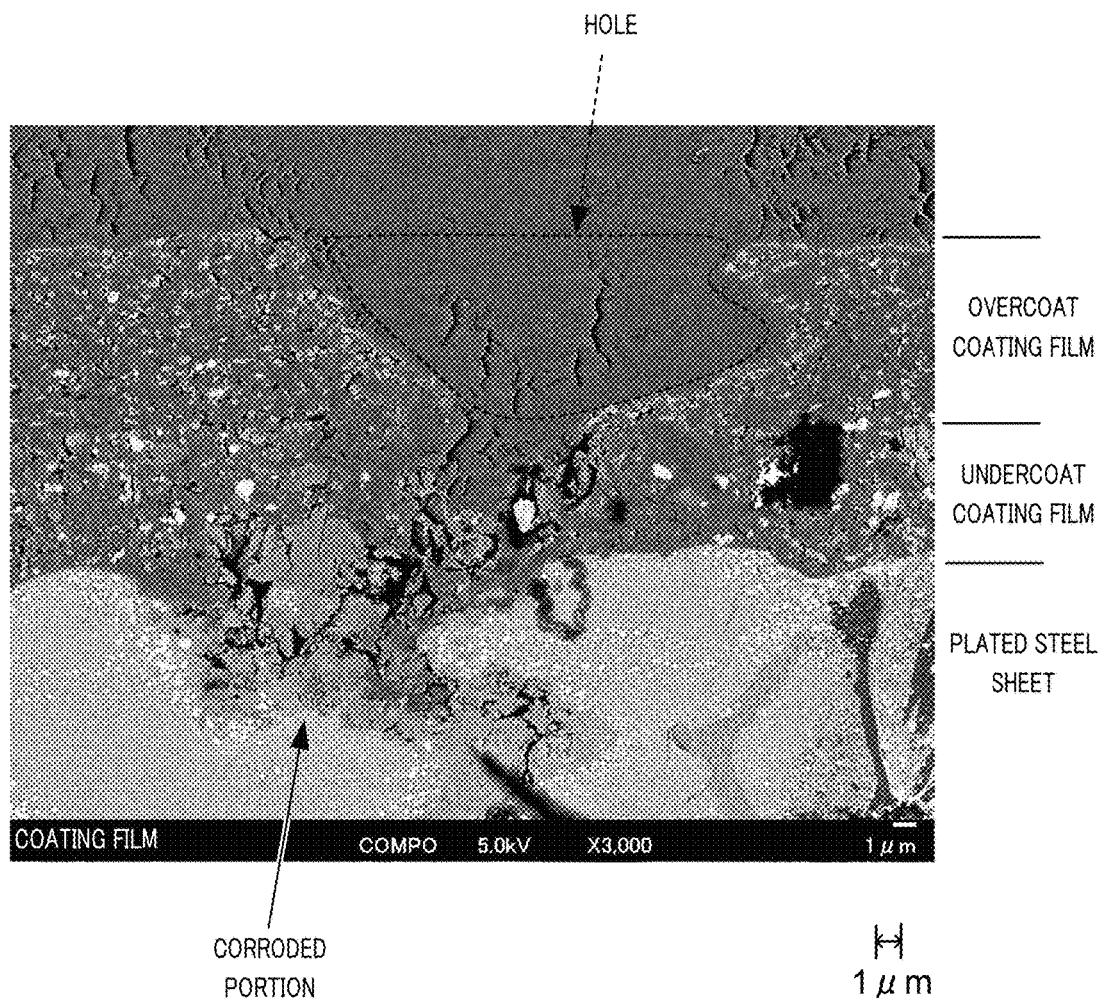
FIG. 4 is a reflection electron micrograph of a cross section along line L, in FIG. 2, in portion B of the coated metal sheet shown in FIG. 2.
Figure 5:
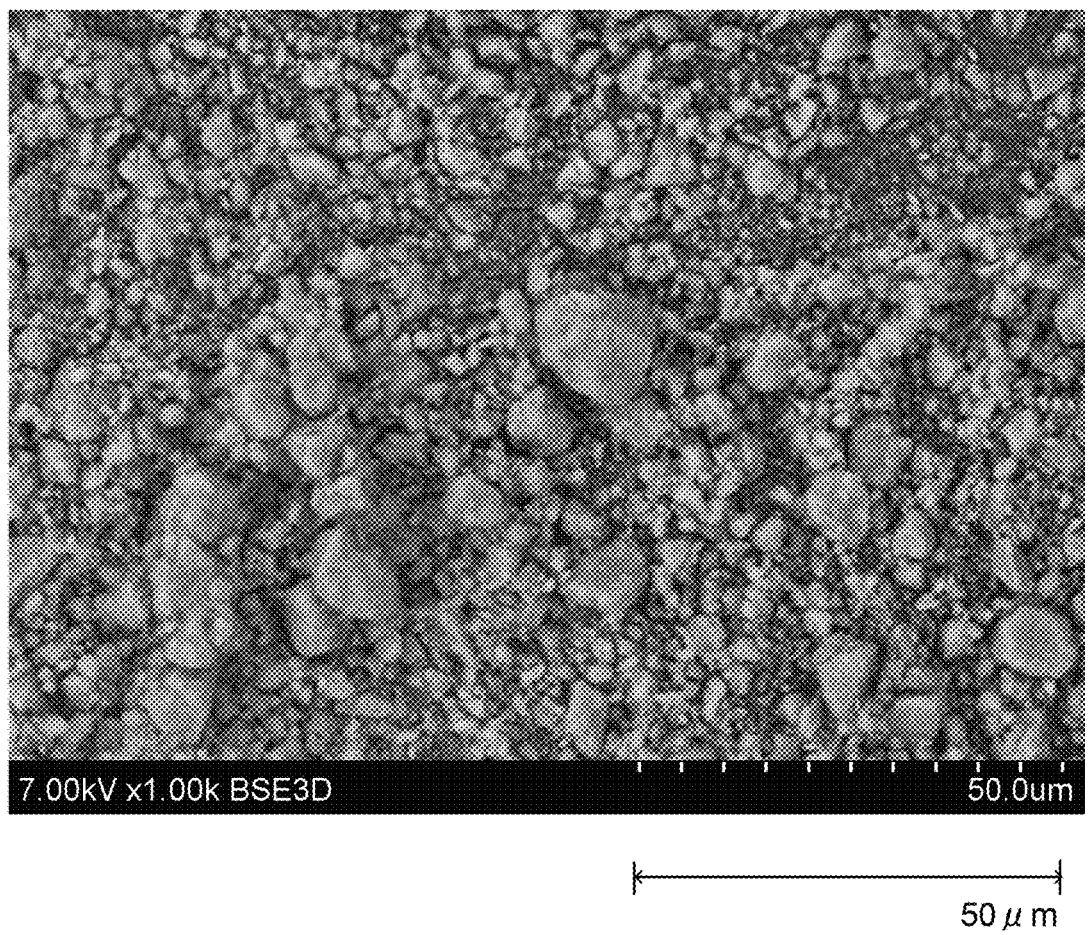
FIG. 5 is an electron micrograph of commercially available silica particles having an average particle diameter of 3.3 µm.
Figure 6A:
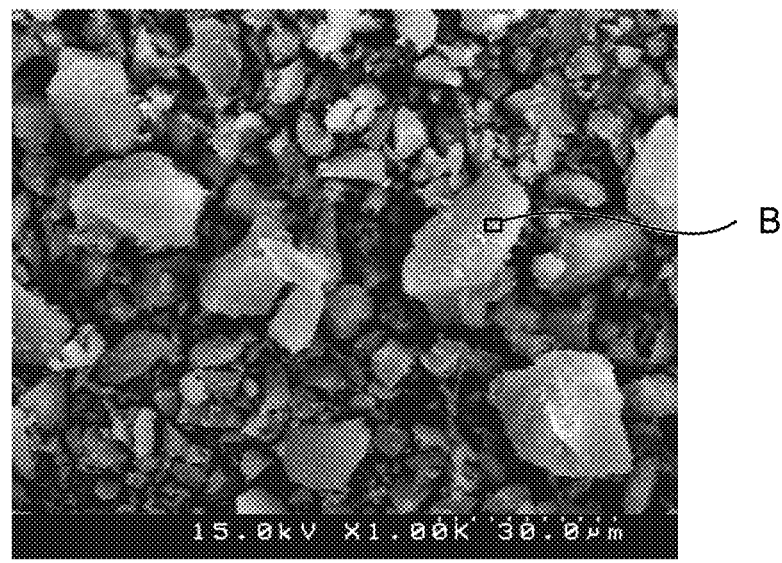
FIG. 6A is an electron micrograph of commercially available silica particles.
Figure 6B:
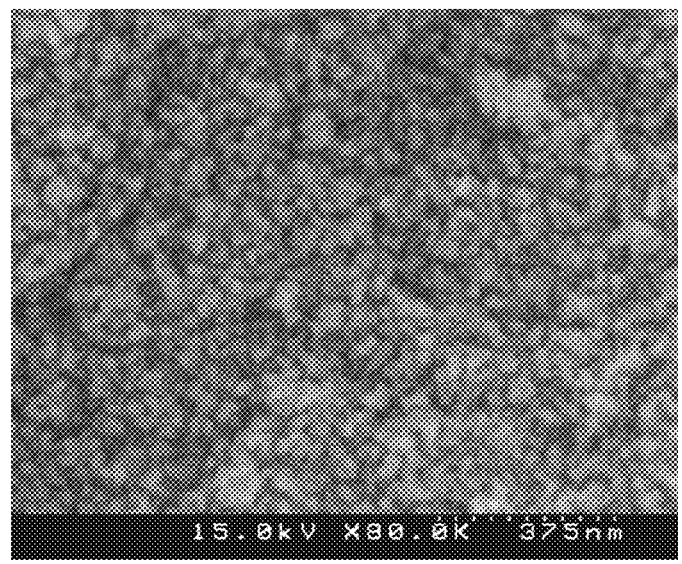
FIG. 6B is an enlarged electron micrograph of portion B in FIG. 6A.
Figure 7A:
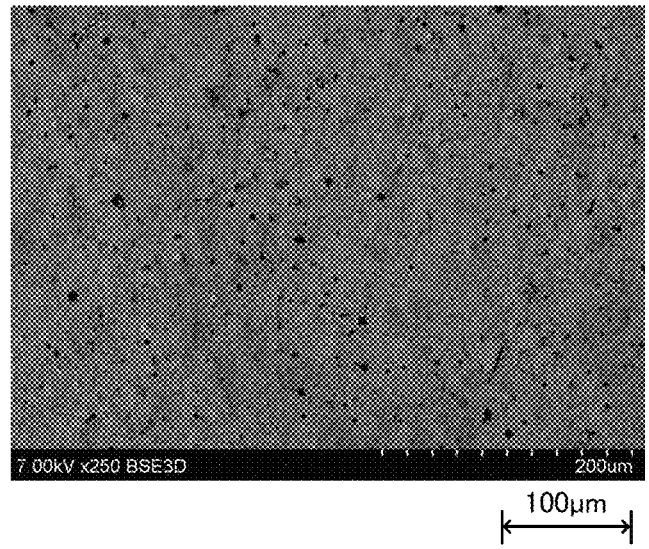
FIG. 7A is an enlarged electron micrograph of a part of the flat portion in a chromate-free and fluorine-resin overcoat coating film on the coated metal sheet in actual use of 7.5 years, shown at a magnification of 250.
Figure 7B:
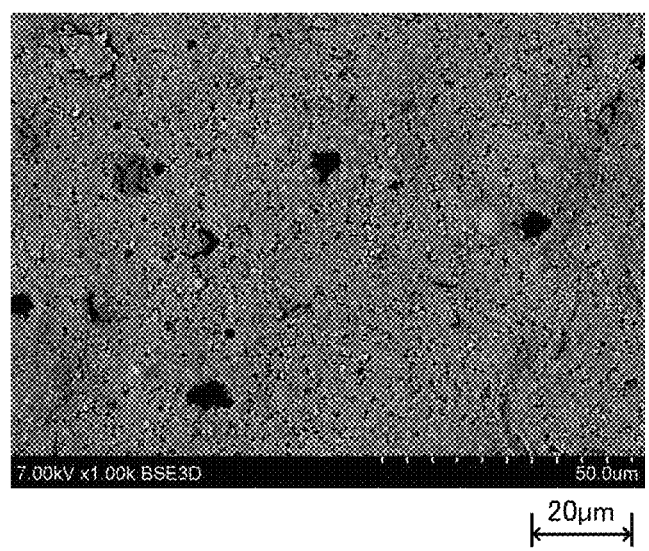
FIG. 7B is an enlarged electron micrograph of the part of the flat portion, shown at a magnification of 1,000.
Figure 8:
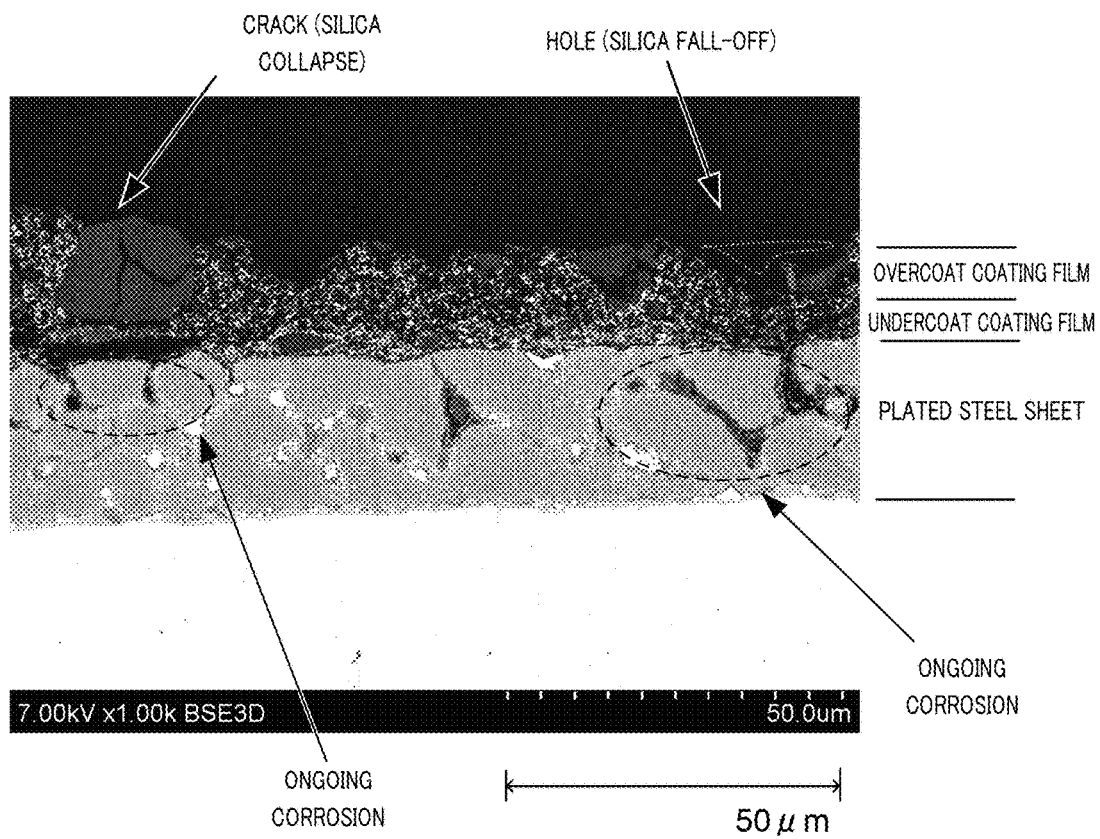
FIG. 8 is a micrograph of a cross section of a corroded portion in the flat portion of a chromate-free coated metal sheet in which silica particles are used as a matting agent.
Figure 9:
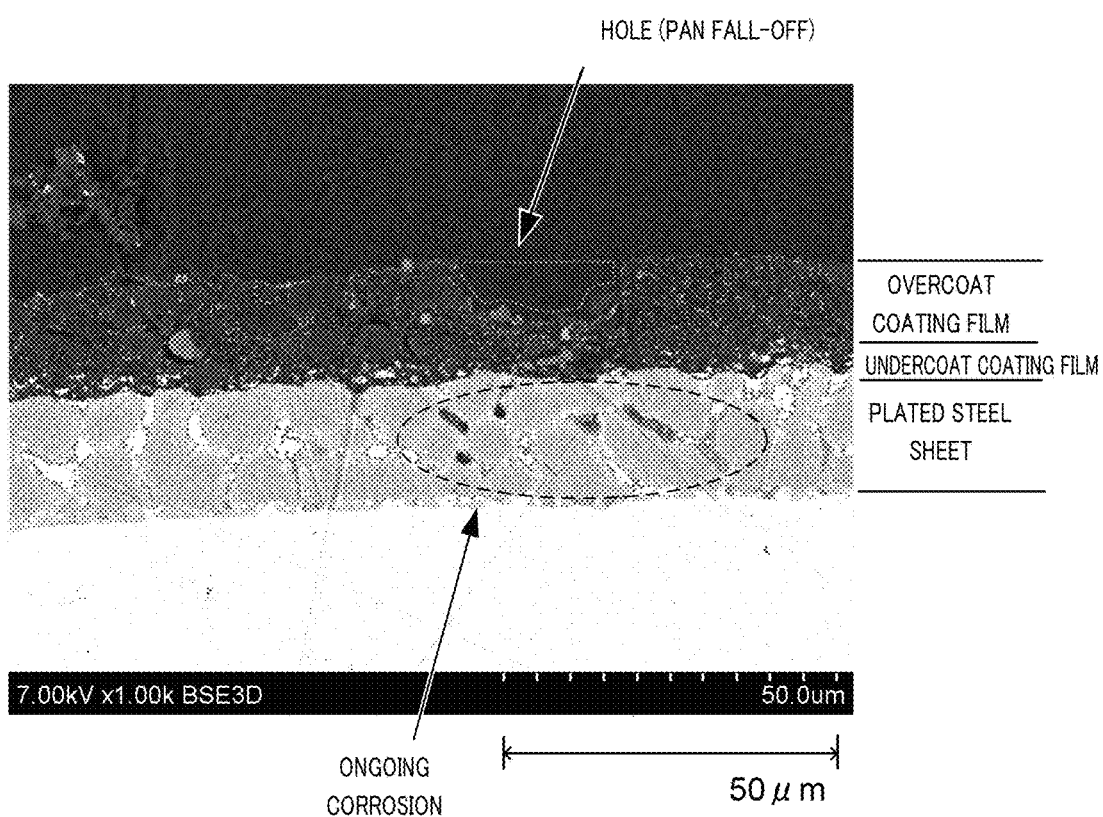
FIG. 9 is a micrograph of a cross section of a corroded portion in the flat portion of a chromate-free coated metal sheet in which PAN particles are used as a matting agent.

Hereinafter, the coated metal sheet according to one embodiment of the present invention will be described. The coated metal sheet includes a metal sheet and an overcoat coating film disposed on/above the metal sheet.

The metal sheet can be selected from known metal sheets as far as the effect of the present embodiment can be achieved. Examples of the metal sheet include cold-rolled steel sheets, galvanized steel sheets, Zn—Al alloy-plated steel sheet, Zn—Al—Mg alloy-plated steel sheets, aluminum-plated steel sheets, stainless steel sheets (including austenitic, martensitic, ferritic, and ferrite-martensite two-phase systems), aluminum sheets, aluminum-alloy sheets, copper sheets and the like. The metal sheets are preferably plated steel sheets from the viewpoint of corrosion resistance, lighter weight, and cost-effectiveness. The plated steel sheet is preferably hot-dip 55% Al—Zn alloy-plated steel sheets, Zn—Al—Mg alloy-plated steel sheets, or aluminum-plated steel sheets, particularly from the viewpoint of corrosion resistance and from the viewpoint of suitability for exterior building materials.

The metal sheet preferably has a chemical conversion film on its surface, from the viewpoint of improving the adhesiveness of the coated metal sheet and the corrosion resistance. Chemical conversion is one type of pre-coating treatment for metal sheets, and a chemical conversion film is a composition layer formed by the pre-coating treatment. The metal sheets are preferred in that the sheets have been subjected to non-chromate anti-rust treatment from the viewpoint of reducing environmental loads in production and use of the coated metal sheet, and in that the sheets have been subjected to chromate anti-rust treatment from the viewpoint of further improving the corrosion resistance.

Examples of the chemical conversion film by the non-chromate anti-rust treatment include Ti—Mo composite films, fluoro acid-based films, phosphate films, resin-based films, resin and silane-coupling-agent-based films, silica-based films, silica and silane-coupling-agent-based films, zirconium-based films, and zirconium and silane-coupling-agent-based films.

From the above-described viewpoint, the amount of the Ti—Mo composite film deposited is preferably 10 to 500 mg/m$^2$ in terms of total Ti and Mo, the amount of the fluoro acid film deposited is preferably 3 to 100 mg/m$^2$ in terms of fluorine or in terms of total elemental metals, and the amount of the phosphate film deposited is preferably 0.1 to 5 g/m$^2$ in terms of elemental phosphorous, on the metal sheet.

The amount of the resin-based film deposited is preferably 1 to 500 mg/m$^2$ in terms of the resin, the amount of the resin and silane coupling agent-based film deposited is preferably 0.1 to 50 mg/m$^2$ in terms of Si, the amount of the silica-based film deposited is preferably 0.1 to 200 mg/m$^2$ in terms of Si, the amount of the silica and silane coupling agent-based film deposited is preferably 0.1 to 200 mg/m$^2$ in terms of Si, the amount of the zirconium-based film deposited is preferably 0.1 to 100 mg/m$^2$ in terms of Zr, and the amount of the zirconium and silane coupling agent-based film deposited is preferably is 0.1 to 100 mg/m$^2$ in terms of Zr.

Also, examples of the chromate anti-rust treatment include coating-type chromate treatment and phosphate-chromate-based treatment. From the above-described viewpoint, the amount of the film deposited by the chromate anti-rust treatment on the metal sheet is preferably from 20 to 80 g/m$^2$ in terms of element chromium.

The overcoat coating film is composed of fluorine resin. The overcoat coating film may further contain other resin as long as the film contains fluorine resin as the main component. For example, the overcoat coating film may be composed of 50 to 85 mass % of fluorine resin based on the resin component in the overcoat coating film and the balance of acrylic resin. The resins in the resin component may or may not bind to each other.

The fluorine resin has excellent durability, chemical resistance, heat resistance, abrasion resistance, contamination resistance, and the like. Above all, the resin is preferably polyvinylidene fluoride (PVDF) because PVDF has high processability and mechanical strength.

The acrylic resin contributes to an increase in coating-film adhesiveness. The acrylic resin is preferably thermoplastic acrylic resin or thermosetting acrylic resin, which has compatibility with polyvinylidene fluoride. Examples of the acrylic resin include polymers of an acrylic monomer, such as methyl methacrylate (MMA), methyl acrylate (MA), ethyl acrylate (EA), butyl acrylate (BA) and butyl methacrylate (BMA), or copolymers of monomers including the acrylic monomers.

The overcoat coating film is preferably composed of a resin component comprising polyvinylidene fluoride and acrylic resin as the main component from the above-described viewpoint. In this case, the mass ratio between polyvinylidene fluoride (PVDF) and the acrylic resin (AR), (PVDF:AR) is preferably in the range of 50:50 to 85:15. When the mass ratio of polyvinylidene fluoride is extremely low, the properties of the fluorine resin such as weather resistance, corrosion resistance, and contamination resistance may not be sufficiently exerted. When the mass ratio of polyvinylidene fluoride is extremely high, the adhesiveness of the overcoat coating film may decrease, and thus the processability of the coated metal sheet may decrease.

The film thickness T of the overcoat coating film is from 3 to 40 μm. An extremely large film thickness T of the overcoat coating film may be responsible for occurrence of defective coating (foaming), reduction in the productivity, increase in the production cost and the like, whereas, with an extremely small film thickness T, the intended designability and the intended flat portion-corrosion resistance may not be achieved. For example, in order to obtain a coated metal sheet that has good productivity, exhibits the intended gloss and coloring, and can be actually used as an exterior building material for at least 10 years, the film thickness T of the overcoat coating film is, for example, preferably 10 μm or more, more preferably 15 μm or more, and still more preferably 25 μm or more from the above-described viewpoint. Also due to the above-described reason, the film thickness T of the overcoat coating film is preferably 35 μm or less, more preferably 30 μm or less. The film thickness T of the overcoat coating film is, for example, the average value of distances from the bottom to the surface at a plurality of positions on a portion where the matting agent of the overcoat coating film is not present.

Alternatively, when the coated metal sheet has other coated film(s) other than the overcoat coating film, the film thickness T of the overcoat coating film can be determined in further consideration of the other coated film(s). For example, when the coated metal sheet has an undercoat coating film described below and the overcoat coating film, the film thickness T of the overcoat coating film is preferably from 10 to 30 μm from the viewpoint of the designability, corrosion resistance, and processability. Alternatively, when the coated metal sheet has the undercoat coating film, an intercoat coating film described below, and the overcoat coating film, the film thickness T of the overcoat coating film is preferably from 3 to 15 μm, from the above-described viewpoint.

The film thickness T of the overcoat coating film is, from the viewpoint of the designability of the coated metal sheet, preferably larger when a color of the overcoat coating film is light, and can be smaller when the color of the overcoat coating film is dark. Although it depends on the case, for example, when the value L of the overcoat coating film is 70 or less, the film thickness T of the overcoat coating film can be 20 μm or less, and when the value L of the overcoat coating film is more than 80, the film thickness is preferably 25 μm or more.

Alternatively, the film thickness T of the overcoat coating film can be smaller, as the color of the overcoat coating film is closer to the color of the surface of the steel sheet before the overcoat coating film is formed (for example, an undercoat coating film described below), from the viewpoint of the designability of the coated metal sheet. Although it depends on the case, for example, when the absolute value ΔL of the difference between the value L of the overcoat coating film and the value L of the color of the surface of the steel sheet before the coating film is formed is 10 or less, the film thickness T of the overcoat coating film can be 13 μm or less, when ΔL is 20 or less, the film thickness T can be 15 μm or less, and when ΔL is 50 or less, the film thickness T can be 17 μm or less.

Incidentally, the value L can be determined by calculation by the Hunter's color difference formula from the measurement result by a commercially available spectrophotometer (for example, manufactured by KONICA MINOLTA OPTICS, INC. "CM3700d").

The overcoat coating film contains a gloss adjusting agent. The gloss adjusting agent is contained in the overcoat coating film to moderately roughen the surface of the overcoat coating film for the purpose to achieve the intended gloss in the coated metal sheet, for the purpose to adjust variation of gloss among production lots and the like, imparting the intended appearance with gloss to the coated metal sheet.

The gloss adjusting agent has a number average particle diameter R (hereinafter, may be also referred to as "R1") of 1.0 μm or more. When the gloss adjusting agent is extremely small, the gloss of the overcoat coating film is extremely high, and thus, the intended designability may not be achieved. As such, it is possible to determine the number average particle diameter of the gloss adjusting agent R1 as appropriate depending on the intended designability (glossiness) of the coated metal sheet as far as R1 satisfies the formula described below. However, when R1 is extremely large, the roughness of the overcoat coating film increases, and thus the intended designability cannot be achieved. For example, from the viewpoint of obtaining a coated metal sheet having a glossiness at 60° of 0.1 to 15 in addition to flat-portion corrosion resistance, the number average particle diameter R1 of the gloss adjusting agent is preferably 2.0 μm or more, more preferably 3.0 μm or more, still more preferably 5.0 μm or more, or still even more preferably 7.0 μm or more. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

Alternatively, when the coated metal sheet has other coated film(s) other than the overcoat coating film, the number average particle diameter R1 of the gloss adjusting agent can be determined depending on the film thickness T of the overcoat coating film. For example, when the coated metal sheet has an undercoat coating film and an overcoat coating film, the number average particle diameter R1 of the gloss adjusting agent is preferably 2.0 μm or more, from the viewpoint of the designability by the intended gloss, corrosion resistance, and processability. Alternatively, when the coated metal sheet has the undercoat coating film, an intercoat coating film described below, and the overcoat coating film, the number average particle diameter R1 of the gloss adjusting agent is 1.0 μm or more, from the above-described viewpoint.

The content of the gloss adjusting agent in the overcoat coating film is 0.01 to 15 vol %. When the content is extremely high, the gloss of the overcoat coating film becomes extremely low, and also, the processed-part adhesiveness decreases. When the content is extremely low, the gloss may not be controlled. Thus, even if the content is extremely large or small, the intended designability may not be achieved. For example, from the viewpoint of obtaining a coated metal sheet having a glossiness at 60° of 0.1 to 15, the content of the gloss adjusting agent in the overcoat coating film is preferably 0.05 vol % or more, more preferably 0.1 vol % or more. Also from the above-described reason, the content of the gloss adjusting agent in the overcoat coating film is preferably 13 vol % or less, more preferably 10 vol % or less. The content can be confirmed by measurement of the ash content in the overcoat coating film, collection of the gloss adjusting agent by dissolution of the overcoat coating film, image analysis of a cross-sectional image of element discrimination conducted at a plurality of points or the like.

The gloss adjusting agent is particles having micropores (hereinafter, may be referred to as "microporous particles"). Examples of the microporous particles include aggregates formed by chemical bonding of primary particles, agglomerates formed by physical bonding of primary particles, and porous particles. The porous particles have a porous structure at least inside the particles. The gloss adjusting agent may be composed solely of the microporous particles or may contain particles other than microporous particles. The microporous particles may be inorganic particles or organic particles, and can be selected from known microporous particles used as a gloss adjusting agent, as far as the particles satisfy the equation described below. Examples of the materials of the microporous particles include silica, calcium carbonate, barium sulfate, polyacrylonitrile, and calcium carbonate-calcium phosphate composites. The gloss adjusting agent is preferably silica particles from the viewpoint of having a high function of adjusting the gloss of coated metal sheets.

The coated metal sheet satisfies the following equation:

$$D1_{97.5}/T \leq 0.9$$

wherein R1 is the number average particle diameter of the gloss adjusting agent (μm), T is the film thickness of the overcoat coating film (μm), and $D1_{97.5}$ is the 97.5% particle diameter (μm) in the accumulated particle size distribution of the gloss adjusting agent based on the number of particles (hereinafter, may also be referred to as "number particle size distribution"). However, when the upper particle size of the number particle size distribution of the gloss adjusting agent is set to Ru (μm), the corresponding Ru is 1.2T or less. "Upper limit particle diameter (Ru)" is a particle diameter when the particle size distribution curve in the number particle size distribution meets the baseline at the number average particle diameter R1 or more.

$D1_{97.5}$ will be a substantial index of the particle diameter of the gloss adjusting agent by which the effect of the present invention is achieved. With extremely large $D1_{97.5}/T$, the microporous particles may be exposed due to wearing of the overcoat coating film during actual use, and the intended flat portion-corrosion resistance may not be achieved. With extremely small $D1_{97.5}/T$, the intended glossiness may not be achieved.

For example, from the viewpoint of obtaining a coated metal sheet having a glossiness at 60° of 0.1 to 15, $D1_{97.5}/T$ is preferably 0.2 or more, more preferably 0.4 or more. Additionally, from the viewpoint of obtaining a coated metal sheet having an actual age of service as an exterior building material of at least 10 years or more, $D1_{97.5}/T$ is more preferably 0.7 or less, still more preferably 0.5 or less.

Meanwhile, in the corresponding number particle size distribution, the content of the particles larger than $D1_{97.5}$ is only about 2.5% based on the number of all the particles. Thus, a gloss adjusting agent of which particle size distribution curve exhibits specific sharpness at a particle diameter of the number average particle diameter R1 or more in the number particle size distribution, satisfying "$D1_{97.5}/T \leq 0.9$", can be applied as it is to the present invention. In other words, the gloss adjusting agent having a meeting point (Ru) of 1.2T or less, at which the particle size distribution curve in the number particle size distribution meets the baseline of the number particle size distribution at the number average particle diameter R1 or more, which satisfies "$D1_{97.5}/T \leq 0.9$", can be applied to the present invention.

The reason why sufficient flat portion-corrosion resistance is exhibited even when the upper limit particle diameter Ru (μm) is 1.2T or less (even when more than 0.9T) can be assumed as follows. First, in the overcoat coating film, the resin composition of the overcoat coating film is superposed on the gloss adjusting agent, and thus, it is conceivable that a gloss adjusting agent having a particle diameter of 1.2T or less normally may not be exposed from the surface of the overcoat coating film. Alternatively, particles having a particle diameter larger than 0.9T in the gloss adjusting agent are unlikely to deviate from the normal distribution so significantly, even if the actual number particle size distribution described above in the range larger than the R1 deviates from the normal distribution. Thus, it is conceivable that the content of the particles will be less than 2.5% at most based on the total. Therefore, it is conceivable that particles having a particle diameter larger than 0.9T in the gloss adjusting agent may be too small in number to substantially influence the flat portion-corrosion resistance. Moreover, the gloss adjusting agent is oddly shaped in general, and usually flattened to some extent. Conceivably, in the gloss adjusting agent in the overcoat coating film, usually the longitudinal direction of the gloss adjusting agent tends to be oriented to the horizontal direction more than the vertical direction due to the application of the overcoat coating material described below, and thus, the particle diameter in the in film-thickness direction in the gloss adjusting agent in the overcoat coating film usually becomes shorter than the long diameter of the gloss adjusting agent (for example, 1.2T).

When the Ru is extremely large, the microporous particles are exposed due to wearing of the overcoat coating film during actual use, and the intended flat portion-corrosion resistance may not be obtained. From the viewpoint of obtaining a coated metal sheet having an actual age of service as an exterior building material of at least 10 years or more, Ru is preferably less than T, more preferably 0.9T or less, still more preferably 0.7T or less. R1, $D1_{97.5}$, and Ru can be determined from the number particle size distribution of the gloss adjusting agent.

Incidentally, the side smaller than the average particle diameter R1 in the number particle size distribution of the gloss adjusting agent may be in any mode as long as the conditions of the particle size distribution are satisfied.

As the gloss adjusting agent that satisfies the conditions according to the particle size distribution, commercially-available products and classified materials thereof can be used.

Incidentally, to produce the coated metal sheet, the gloss adjusting agent may not satisfy the particle size conditions aforementioned (for example, coarse particles larger than 1.2T are present and the like), or may deviate from the above-described conditions in the process of production. In this case, a step of pulverizing the coarse particles in the overcoat coating material described below, such as roller mill treatment as described below, is suitably performed from the viewpoint of obtaining the coated metal sheet.

The overcoat coating film also contain a matting agent. The matting agent is contained to the overcoat coating film in order to exhibit unevenness that is larger than the coarseness to be imparted by a gloss adjusting agent to the overcoat coating film and can be visually confirmed and to impart a texture, providing the coated metal sheet with the intended appearance. The matting agent also includes those having a particle diameter larger than the film thickness of the overcoat coating film, and thus can prevent the overcoat coating film from being scratched. Thereby, the scratch resistance of the coated metal sheet can be improved.

Although the number average particle diameter of the matting agent (hereinafter, may be also referred to as "R2") is not particularly limited, the matting agent having an extremely small particle diameter cannot reduce the gloss of the overcoat coating film, and the intended designability may not be achieved. It is possible to determine the number average particle diameter of the matting agent R2 as appropriate depending on the intended designability (glossiness) of the coated metal sheet as far as R2 satisfies the equation described below. However, when R2 is extremely large, the matting agent causes streaks on coating, and the intended designability may not be achieved. For example, to obtain a coated metal sheet having a glossiness at 60° of 0.1 to 15 in addition to flat-portion corrosion resistance, the number average particle diameter R2 of the matting agent is preferably 5.0 µm or more, more preferably 10.0 µm or more, still more preferably 15.0 µm or more, even more preferably 20 µm or more, still even more preferably 25 µm or more. Also, due to the above-described reason, the number average particle diameter of the matting agent R2 is preferably 80 µm or less, more preferably 50 µm or less, still more preferably 40 µm or less. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

The content of the matting agent in the overcoat coating film is 0.01 to 15 vol %. When the content is extremely high, the gloss of the overcoat coating film decreases, and also, the processed-part adhesiveness decreases. In contrast, when the content is extremely low, gloss cannot be adjusted, and in both cases, the intended designability may not be achieved. For example, from the viewpoint of obtaining a coated metal sheet having a glossiness at 60° of 0.1 to 15, the content of the matting agent in the overcoat coating film is preferably 0.1 vol % or more. Also due to the above-described reason, the content of the matting agent in the overcoat coating film is preferably 13 vol % or less, more preferably 10 vol % or less. The content can be confirmed by measurement of the ash content in the overcoat coating film, collection of the matting agent by dissolution of the overcoat coating film, image analysis of a cross-sectional image of element discrimination conducted at a plurality of points or the like.

The matting agent is primary particles. The primary particles refer to particles having no micropores that may cause the particles to collapse when the substance (for example, water) present in their voids expands. The primary particles may be resin particles or inorganic particles, and can be selected from known primary particles used as a matting agent, as far as the particles satisfy the equation described below. Specific examples of the primary particles include primary particles composed of resin such as acrylic resin, polyurethane resin, polyester resin, melamine resin, urea resin, polyamide resin and the like (resin particles); and primary particles composed of an inorganic compound such as glass, silicon carbide, boron nitride, zirconia, alumina, silica, and the like (inorganic particles). The shape of these primary particles is preferably approximately spherical, but may be other shape such as a cylindrical shape, a disc shape and the like. Also, recesses and the like may be present on the surface of the primary particles unless they are micropores that may become an origin of collapse of the particles.

The coated metal sheet satisfies the following equation:

$$0.5 \leq D2_{97.5}/T \leq 7.0$$

wherein T (µm) is the film thickness of the overcoat coating film, and $D2_{97.5}$ is the 97.5% particle diameter (µm) in the accumulated particle size distribution of the matting agent based on the number of particles.

$D2_{97.5}$ will be a substantial index of the particle diameter of the matting agent by which the effect of the present invention is achieved. When $D2_{97.5}/T$ is extremely large, streaks or the like attributable to the matting agent occur on coating of the overcoat coating film, and a fair coating appearance may not be achieved. When $D2_{97.5}/T$ is extremely small, the intended texture may not be achieved.

For example, from the viewpoint of obtaining a coated metal sheet having a glossiness at 60° of 0.1 to 15, $D2_{97.5}/T$ is preferably 1 or more, more preferably 2 or more, even more preferably 3 or more, still even more preferably 4 or more. Additionally, for example, from the viewpoint of obtaining a coated metal sheet having an actual age of service as an exterior building material of at least 10 years or more, $D2_{97.5}/T$ is preferably 6 or less, more preferably 5 or less. R2 and $D2_{97.5}$ can be determined from the number particle size distribution of the matting agent.

The overcoat coating film may further contain other ingredients besides the resin, gloss adjusting agent, and matting agent aforementioned, as far as the effect of the present embodiment can be achieved. For example, the overcoat coating film may further contain a colorant. Examples of the colorant include inorganic pigments such as titanium oxide, calcium carbonate, carbon black, iron black, iron oxide yellow, titanium yellow, colcothar, iron blue, cobalt blue, cerulean blue, ultramarine blue, cobalt green, molybdenum red and the like; composite oxide calcined pigments containing metal components such as CoAl, CoCrAl, CoCrZnMgAl, CoNiZnTi, CoCrZnTi, NiSbTi, CrSbTi, FeCrZnNi, MnSbTi, FeCr, FeCrNi, FeNi, FeCrNiMn, CoCr, Mn, Co, SnZnTi and the like; metallic pigments such as Al flakes, resin-coated Al flakes, Ni flakes, stainless flakes and the like; and organic pigments such as Quinacridone Red, Lithol Red B, Brilliant Scarlet G, Pigment Scarlet 3B, Brilliant Carmine 6B, Lake Red C, Lake Red D, Permanent Red 4R, Bordeaux 10B, Fast Yellow G, Fast Yellow 10G, Pare Red, Watching Red, Benzidine Yellow, Benzidine Orange, Bon Maroon L, Bon Maroon M, Brilliant Fast Scarlet, Vermilion Red, Phthalocyanine Blue, Phthalocyanine Green, Fast Skyblue, Aniline Black and the like. The colorant is sufficiently smaller relative to the gloss adjusting agent, and, for example, the number average particle diameter of the colorant is 0.01 to 1.5 µm. The content of the colorant in the overcoat coating film is, for example, 2 to 20 vol %.

The overcoat coating film may further contain an extender pigment. Examples of the extender pigment include barium sulfate and titanium oxide. The extender pigment is sufficiently smaller relative to the gloss adjusting agent, and, for example, the number average particle diameter of the extender pigment is 0.01 to 1 µm. The content of the extender pigment in the overcoat coating film is, for example, 0.1 to 15 vol %.

The overcoat coating film may further contain a lubricant, from the viewpoint of preventing the occurrence of galling in the overcoat coating film on processing the coated metal sheet. Example of the lubricant include organic waxes such as fluorine-based wax, polyethylene-based wax, styrene-based wax, polypropylene-based wax and the like, and inorganic lubricants such as molybdenum disulfide, talc and the like. The content of the lubricant in the overcoat coating film is, for example, 0 to 10 vol %.

The overcoat coating film is produced by a known method that includes applying a coating material for overcoat coating films (overcoat coating material) to the surface of the metal sheet, the surface of the undercoat coating film described below or the like, drying the coating material, and curing the coating material as required. The overcoat coating material contains materials for the overcoat coating film aforementioned, and may further contain other ingredients besides the materials as far as the effect of the present embodiment can be achieved.

For example, the overcoat coating material may further contain a curing agent. The curing agent crosslinks the fluorine resin or acrylic resin aforementioned on curing (baking) when the overcoat coating film is produced. The type of the curing agent can be selected from the crosslinking agent aforementioned and known curing agents as appropriate, depending on the type of the resin to be used, baking conditions and the like.

Examples of the curing agent include melamine compounds, isocyanate compounds, combinations of a melamine compound and an isocyanate compound and the like. Examples of the melamine compound include imino group-type, methylol-imino group-type, methylol group-type, or complete alkyl group-type melamine compounds. The isocyanate compound may be any of aromatic, aliphatic, and alicyclic compounds, and examples include m-xylene diisocyanate, hexamethylene diisocyanate, naphthalene diisocyanate, isophorone diisocyanate, and block compounds of these.

The overcoat coating film may further contain a curing catalyst as appropriate as far as the storage stability of the overcoat coating material is not affected. The content of the curing agent in the overcoat coating film is for example, 10 to 30 vol %.

The overcoat coating film may also contain 10 vol % or less of an ultraviolet absorber (UVA) or a light stabilizer (HALS) as appropriate in order to further improve the weather resistance. Furthermore, the overcoat coating film may contain a hydrophilizing agent, for example, 30 vol % or less of a partially hydrolyzed condensate of tetraalkoxysilane for prevention of rain streak stains.

The coated metal sheet may have further components, as far as the effect of the present embodiment can be exerted. For example, the coated metal sheet preferably further may have an undercoat coating film between the metal sheet and the overcoat coating film, from the viewpoint of improving the adhesiveness and the corrosion resistance of the overcoat coating film in the coated metal sheet. The undercoat coating film is disposed on the surface of the metal sheet, or, when the chemical conversion film has been made, on the surface of the chemical conversion film.

The undercoat coating film is composed of resin. Examples of the resin include epoxy resin, polyester, epoxy-modified polyester resin, acrylic resin, and phenoxy resin.

The undercoat coating film may further contain an anti-rust pigment, a coloring pigment, a metallic pigment, an extender pigment or the like. Examples of the anti-rust pigment include non-chromium-based anti-rust pigments such as modified silica, vanadates, magnesium hydrogenphosphate, magnesium phosphate, zinc phosphate, aluminum polyphosphate and the like, and chromium-based anti-rust pigments such as strontium chromate, zinc chromate, barium chromate, calcium chromate and the like. Example of the coloring pigment include titanium oxide, carbon black, chromium oxide, iron oxide, colcothar, titanium yellow, cobalt blue, cobalt green, Aniline Black, and Phthalocyanine Blue. Example of the metallic pigment include aluminum flakes (non-leafing type), bronze flakes, copper flakes, stainless steel flakes, and nickel flakes. Examples of the extender pigment include barium sulfate, titanium oxide, silica, and calcium carbonate.

The content of the pigment in the undercoat coating film can be determined as appropriate, as far as the effect of the present embodiment can be achieved. For example, the content of the anti-rust pigment in the undercoat coating film is preferably, for example, 10 to 70 vol %.

Also, the coated metal sheet further has an intercoat coating film between the undercoat coating film and the overcoat coating film, from the viewpoint of improving the adhesiveness and the corrosion resistance of the overcoat coating film in the coated metal sheet.

The intercoat coating film is composed of resin. Examples of the resin include fluorine resin such as polyvinylidene fluoride and the like, polyester, polyester-modified silicones, acrylic resin, polyurethane, and polyvinyl chloride. The intercoat coating film also may further contain additives such as an anti-rust pigment, a coloring pigment, a metallic pigment, or the like, similarly as the undercoat coating film, as far as the effect of the present embodiment can be achieved.

The coated metal sheet according to the present embodiment is a chromate-free or chromate-based coated metal sheet. "Chromate-free" means that the coated metal sheet contains substantially no hexavalent chromium. It is possible to confirm that the coated metal sheet is "chromate-free" as follows. For example, in any of the metal sheet, the chemical conversion film, the undercoat coating film, and the overcoat coating film aforementioned, four 50 mm×50 mm specimens are cut off from a metal sheet on which the overcoat coating film or the undercoat coating film has been produced singly, and the specimens are immersed in 100 mL of boiling pure water for 10 minutes. Then, when hexavalent chromium eluted in pure water is quantified by a concentration analysis method in compliance with JIS H8625, Annex 2. 4. 1, "Diphenylcarbazide Visual Colorimetric Method", the concentration shall be lower than the detection limit. Hexavalent chromium is not eluted form the coated metal sheet during actual use into the environment, and the coated metal sheet exhibits sufficient corrosion resistance at its flat portion. Incidentally, a "flat portion" refers to a portion that is covered with the overcoat coating film of the metal sheet and has not been deformed by bending, drawing, bulging, embossing, roll-forming or the like.

The coated metal sheet is suitable for a matte-coated metal sheet. Matte refers to a glossiness at 60° being from 0.1 to 15. When the glossiness is extremely high, an enamel-like gloss may predominate, and a matte feeing may not be achieved. The above-described glossiness is adjusted with the average particle diameter of the gloss adjusting agent and matting agent, their contents in the overcoat coating film and the like.

The coated metal sheet include a first step of applying an overcoat coating material that contains the fluorine resin, the gloss adjusting agent, and the matting agent onto the metal sheet and a second step of curing the coating film of the overcoat coating material to form the overcoat coating film.

In the above-described first step, the overcoat coating material may be applied directly onto the surface of the metal sheet, may be applied onto the chemical conversion film formed on the surface of the metal sheet, or may be applied onto the undercoat coating film formed on the surface of the coated metal sheet or the surface of the chemical conversion film.

The overcoat coating material is prepared by, for example, dispersing the materials for the overcoat coating film aforementioned in a solvent. The coating material may contain a solvent, a crosslinking agent and the like. Examples of the solvent include hydrocarbons such as toluene, xylene and the like; esters such as ethyl acetate, butyl acetate and the like; ethers such as cellosolve and the like; and ketones such as methyl isobutyl ketone, methyl ethyl ketone, isophorone, cyclohexanone and the like.

The overcoat coating material is applied, for example, by a known method such as roll coating, curtain flow coating, spray coating, immersion coating and the like. The amount of the overcoat coating material coated is adjusted as appropriate, depending on the intended film thickness T of the overcoat coating film.

Incidentally, as aforementioned, blending a matting agent into the overcoat coating film allows a unique design to be exhibited as well as can improve the scratch resistance of the coated metal sheet. In order to achieve both the designability and the scratch resistance, the overcoat coating film is preferably coated thicker than a coating film that contains a gloss adjusting agent only and contains no matting agent. Also, since the ratio of nonvolatile ingredients in the coating material increases by blending a matting agent into the overcoat coating film, the overcoat coating film can be coated thicker than a coating film that contains a gloss adjusting agent only and contains no matting agent.

The gloss adjusting agent contained in the overcoat coating material satisfies the aforementioned size conditions. In the overcoat coating material, when the gloss adjusting agent does not satisfy the aforementioned size conditions, the overcoat coating material that satisfies the above-described conditions can be obtained by subjecting the overcoat coating material to treatment for pulverizing the particles in the overcoat coating material. Examples of the above-described "treatment for pulverizing the particles" include roller mill treatment. More specifically, the treatment is conducted by appropriately setting the clearance between the rollers of the roller mill and treatment time such that the Ru falls below 1.2T before a matting agent is blended to the overcoat coating material. Thereafter, the overcoat coating material that satisfies the above-described conditions can be obtained by blending the matting agent.

The above-described second step can be conducted, for example, by a known method for baking the overcoat coating material onto a metal sheet. For example, in the second step, a metal sheet to which a overcoat coating material has been applied is heated such that the temperature of the metal sheet reaches 200 to 250° C.

The production method of the coated metal sheet may include other steps other than the first step and second step aforementioned, as far as the effect of the present invention can be achieved. Examples of the other steps include a step for forming a chemical conversion film, a step for forming an undercoat coating film, and a step for forming an intercoat coating film.

The chemical conversion film can be formed by applying an aqueous chemical conversion liquid for forming the film by a known method such as roll-coating, spin-coating, spraying methods and the like, to the metal sheet surface and drying the metal sheet after application without water washing. The drying temperature and the drying time for the metal sheet are preferably 60 to 150° C. as the temperature which the metal sheet reaches and 2 to 10 seconds, for example, from the viewpoint of productivity.

The undercoat coating film is produced by application of a coating material for undercoat coating films (undercoat coating material). The undercoat coating material may contain a solvent, a crosslinking agent and the like. Examples of the solvent include compounds exemplified as solvents for the overcoat coating material. Examples of the crosslinking agent include melamine resin, isocyanate resin and the like for crosslinking the resin aforementioned. The undercoat coating material is prepared by homogeneously mixing and dispersing the materials aforementioned.

The undercoat coating material is, for example, applied on the metal sheet by the known method aforementioned for overcoat coating material such that a dry film thickness of 1 to 10 μm, preferably 3 to 7 μm is obtained. A coating film of the coating material is produced by heating a metal sheet at, for example, 180 to 240° C., a temperature which the metal sheet achieves, thereby baking the film onto the metal sheet.

The intercoat coating film is also produced by application of a coating material for intercoat coating films (intercoat coating material), similarly as the undercoat coating film. The intercoat coating material also may contain the solvent, the crosslinking agent and the like in addition to the materials for the intercoat coating film. The intercoat coating material is prepared by homogeneously mixing and dispersing the materials aforementioned. The intercoat coating material is preferably applied, for example, by the above-described known method, to the undercoat coating film in an amount to be coated such that the sum of the dry film thickness of the coating material and the film thickness of the undercoat coating film reaches 3 to 20 μm (preferably 5 to 15 μm), from the viewpoint of the processability. A coating film of the coating material is produced by heating a metal sheet at, for example, 180 to 240° C., a temperature which the metal sheet achieves, thereby baking the film above the metal sheet.

Applications of the coated metal sheet are suitable for exterior use. "For exterior use" refers to being used in portions exposed to the open air such as roofs, walls, accessories, signboards, outdoor-installed apparatuses and the like, wherein the portions may be irradiated with a sunbeam and its reflected light. Examples of the coated metal sheet for exterior use include coated metal sheets for exterior building materials and the like.

The coated metal sheet is formed into an exterior building material by known processing such as bending, drawing, bulging, embossing, roll-forming or the like. In this manner, the exterior building material is composed of the coated metal sheet. The exterior building material may further include other structure as far as the above-described effects can be achieved. For example, the exterior building material may further have a structure to be subjected to appropriate installation during actual use of the exterior building material. Examples of such a structure include members to fix an exterior building material to a building, members to connect a plurality of exterior building materials, marks that show the direction of an exterior building material on mounting, foam sheets and foam layers to improve the thermal insulation properties and the like. These structures may be included in the coated metal sheet for exterior use aforementioned.

In the coated metal sheet, the gloss adjusting agent (microporous particles) is sufficiently confined in the overcoat coating film. Additionally, the particle diameter of the gloss adjusting agent in the overcoat coating film in the film thickness direction of the overcoat coating film is likely to become sufficiently small as its particle shape is lower-profile. Furthermore, about 97.5% by number, that is, the most portion of the gloss adjusting agent has a sufficiently small particle diameter of 0.9T or less relative to the film thickness T of the overcoat coating film. Thus, the overcoat coating film can be designed such that the microporous particles are not exposed within the intended age of service, even if the resin in the overcoat coating film is gradually worn from the surface of the overcoat coating film by actual use in an exterior application.

Meanwhile, in the coated metal sheet, although the matting agent is covered with the resin constituting the overcoat coating film, at least a part of the particles in the matting agent is larger than the film thickness of a portion of the overcoat coating film where the matting agent is not contained. Thus, the matting agent may appear from the overcoat coating film when the resin in the overcoat coating film is gradually worn from the surface of the overcoat coating film by actual use in an exterior application, even during the intended age of service. In such a situation, if microporous particles as the matting agent are contained in the overcoat coating film, a portion of the overcoat coating film where the matting agent cracks, collapses, or falls off may become an origin of corrosion. Thus, primary particles are contained as the matting agent in the coated metal sheet. Therefore, even if the primary particles appear from the surface of the overcoat coating film by actual use in an exterior application, cracking and collapse as those occurring in microporous particles and fall-off from the overcoat coating film are prevented, and corrosive factors such as rainwater cannot reach the metal sheet.

Therefore, cracking, collapse, and falling-off from the overcoat coating film of the gloss adjusting agent (microporous particles) and cracking, collapse, and falling-off from the overcoat coating film of the matting agent (primary particles) within the intended age of service are prevented, and corrosive factors such as rainwater and the like cannot reach the metal sheet during the intended age of service. Thus, the coated metal sheet, if being chromate-free (if the metal sheet has been non-chromate anti-rust treated), exhibits flat portion-corrosion resistance at least equivalent to that of conventional chromate-treated coated metal sheets, and if having been subjected to chromate treatment, exhibits flat portion-corrosion resistance equivalent to or greater than that of conventional chromate-treated coated metal sheets. Examples of the "chromate treatment" of the coated metal sheet in the embodiment include, in addition to the chromate anti-rust treatment of the metal sheet, the adoption of an undercoat coating film containing a chromate-based anti-rust pigment. Examples of the "coated metal sheet subjected to chromate treatment" include coated metal sheets that have a non-chromate anti-rust treated metal sheet and an undercoat coating film containing a chromate-based anti-rust pigment, coated metal sheets that has a chromate anti-rust treated metal sheet and an undercoat coating film containing no chromate-based anti-rust pigment, and coated metal sheet that have a chromate anti-rust treated metal sheet and an undercoat coating film containing a chromate-based anti-rust pigment.

As clear from the above description, according to the present embodiment, there can be provided a coated metal sheet which, even being chromate-free, has sufficient flat-portion corrosion resistance, wherein the coated metal sheet has a metal sheet and an overcoat coating film disposed on the metal sheet, wherein the overcoat coating film contains fluorine resin and a gloss adjusting agent which is particles having micropores (microporous particles) and a matting agent which is primary particles, wherein the content of the gloss adjusting agent in the overcoat coating film is from 0.01 to 15 vol %, and the content of the matting agent in the overcoat coating film is from 0.01 to 15 vol %, and wherein the following equations are satisfied:

$D1_{97.5}/T \leq 0.9$ $Ru \leq 1.2T$ $R1 \geq 1.0$ $0.5 \leq D2_{97.5}/T \leq 7.0$ $3 \leq T \leq 40$ wherein R1 (µm) is the number average particle diameter of the gloss adjusting agent, T (µm) is the film thickness of the overcoat coating film, $D1_{97.5}$ (µm) is the 97.5% particle diameter in the number particle size distribution of the gloss adjusting agent, $D2_{97.5}$ (µm) is the 97.5% particle diameter in the accumulated particle size distribution of the matting agent based on the number of particles, and Ru (µm) is the upper limit particle diameter in the number particle size distribution of the gloss adjusting agent.

The fact that the Ru is less than T is even more effective, from the viewpoint of further improvement of the flat portion-corrosion resistance of the coated metal sheet, or from the viewpoint of further prolongation of the life of the coated metal sheet having sufficient flat portion-corrosion resistance.

Additionally, the fact that the metal sheet has been subjected to non-chromate anti-rust treatment and the coated metal sheet is chromate-free is even more effective, from the viewpoint of reducing environmental loads in use or production of the coated metal sheet, and the fact that the metal sheet has been subjected to chromate anti-rust treatment is even more effective, from the viewpoint of further improvement of the flat portion-corrosion resistance of the coated metal sheet.

Also, the fact that the gloss adjusting agent is silica particles is even more effective, from the viewpoint of inexpensively producing coated metal sheets having the intended designability.

Also, the fact that the coated metal sheet further has an undercoat coating film between the metal sheet and the overcoat coating film is more effective from the viewpoint of improving the adhesiveness and corrosion resistance of the overcoat coating film in the coated metal sheet, and the fact that the coated metal sheet further has an intercoat coating film between the undercoat coating film and the overcoat coating film is even more effective, from the above-described viewpoint.

Additionally, the fact that the overcoat coating film is composed of a resin component comprising polyvinylidene fluoride and acrylic resin as the main component is even more effective, from the viewpoint that the properties of the fluorine resin such as weather resistance, corrosion resistance, and contamination resistance and the properties of the acrylic resin such as adhesiveness of the overcoat coating film are both exhibited.

Also, when the coated metal sheet has a glossiness at 60° of 0.1 to 15, both the intended designability and sufficient flat portion-corrosion resistance are achieved.

Additionally, the fact that the coated metal sheet is a coated metal sheet for exterior use is further effective from the viewpoint of reducing a load on the environment due to elution of chromium during actual use.

An exterior building material composed of the coated metal sheet is chromate-free as well as can exhibit excellent flat portion-corrosion resistance during actual use of 10 years or more.

Additionally, the aforementioned method for producing a coated metal sheet having the metal sheet and the overcoat coating film disposed on the metal sheet comprises the steps of: applying an overcoat coating material that contains the fluorine resin, the gloss adjusting agent, and the matting agent onto the metal sheet and curing the coating film of the overcoat coating material to form the overcoat coating film, wherein the content of the gloss adjusting agent in the overcoat coating film is from 0.01 to 15 vol %, and the content of the matting agent in the overcoat coating film is from 0.01 to 15 vol %, wherein the gloss adjusting agent is particles having micropores, and the matting agent is primary particles, and wherein the gloss adjusting agent and the matting agent which satisfy the following equations are employed:

$$D1_{97.5}/T \leq 0.9$$

$$Ru \leq 1.2T$$

$$R1 \geq 1.0$$

$$0.5 \leq D2_{97.5}/T \leq 7.0$$

$$3 \leq T \leq 40$$

wherein R1 (μm) is the number average particle diameter of the gloss adjusting agent, T (μm) is the film thickness of the overcoat coating film, $D1_{97.5}$ (μm) is the 97.5% particle diameter in the number particle size distribution of the gloss adjusting agent, $D2_{97.5}$ (μm) is the 97.5% particle diameter in the accumulated particle size distribution of the matting agent based on the number of particles, and Ru (μm) is the upper limit particle diameter in the number particle size distribution of the gloss adjusting agent. Accordingly, it is possible to provide a coated metal sheet which, even being chromate-free, has excellent flat-portion corrosion resistance equivalent to or greater than that of coated metal sheets comprising a chromate anti-rust treated metal sheet.

In the above-described production method, when the overcoat coating material has been subjected to treatment for pulverizing the particles in the overcoat coating material, coarse particles present accidentally and irregularly in the overcoat coating film are substantially removed from the overcoat coating material. Thus, the treatment is even more effective, from the viewpoint of further improvement of the flat portion-corrosion resistance of the coated metal sheet.

Hereinafter, the present invention will be described in more detail with reference to Examples, but the present invention is not limited by these Examples.

EXAMPLES

[Production of Coated Base Sheets 1 to 5]

A hot-dip 55% Al—Zn alloy-plated steel sheet having an amount deposited on both the sides of 150 g/m² was alkali-degreased (base sheet 1). Subsequently, a non-chromate anti-rust treatment solution described below at 20° C. was applied to the surface of the plated layer of the plated steel sheet, as pre-coating treatment. The plated steel sheet was dried at 100° C. without washing with water to thereby obtain a non-chromate anti-rust treated plated steel sheet having an amount of deposited of 10 mg/m² in terms of Ti (base sheet 2).

(Non-Chromate Anti-Rust Treatment Solution)

| Hexafluorotitanate | 55 g/L |
|---|---|
| Hexafluorozirconate | 10 g/L |
| Aminomethyl-substituted polyvinyl phenol | 72 g/L |
| Water | Balance |

Additionally, to a surface of base sheet 2, the following undercoat coating material containing epoxy resin was applied. The chemical conversion steel sheet was heated such that the temperature of the plated steel sheet reached 200° C. to thereby obtain the chromate-free plated steel sheet including an undercoat coating film having a dry film thickness of 5 μm (base sheet 3).

| Phosphate mixture | 15 vol % |
|---|---|
| Barium sulfate | 5 vol % |
| Silica | 1 vol % |
| Clear coating material | Balance |

Alternatively "SURFCOAT NRC300NS" manufactured by Nippon Paint Co., Ltd. ("SURFCOAT" is a registered trademark of the company), which is a chromate treatment solution, was used instead of the chromate-free treatment solution to conduct chromate anti-rust treatment of an amount deposited of 20 mg/m² in terms of chromium. Subsequently, to the surface of the chromate anti-rust treated plated steel sheet, the following undercoat coating material containing epoxy resin was applied. The chemical conversion steel sheet was heated such that the temperature of the plated steel sheet reached 200° C. to thereby obtain a plated steel sheet including a chromate-based undercoat coating film having a dry film thickness of 5 μm (base sheet 4).

| Strontium chromate | 15 vol % |
|---|---|
| Barium sulfate | 5 vol % |
| Silica | 1 vol % |
| Clear coating material | Balance |

Incidentally, in the undercoat coating material, the clear coating material is "NSC680" manufactured by Nippon Fine Coatings Co., Ltd. In the undercoat coating material, the phosphate mixture is a mixture of magnesium hydrogenphosphate, magnesium phosphate, zinc phosphate, and aluminum tripolyphosphate. Also, the silica is a extender pigment and has an average particle diameter of 5 μm. Additionally, the vol % is a proportion relative to the solid content in the undercoat coating material.

Alternatively, to a surface of base sheet 3, the following intercoat coating material containing polyester was applied. The chemical conversion steel sheet was heated such that the temperature of the plated steel sheet reached 220° C. to thereby obtain the chromate-free plated steel sheet including an intercoat coating film having a dry film thickness of 15 μm on the undercoat coating film (base sheet 5).

| Carbon black | 7 vol % |
|---|---|
| Silica particles 1 | 1 vol % |
| Fluorine resin-based coating material | Balance |

The fluorine resin-based coating material is a clear coating material "DICFLUOR C" manufactured by Nippon Fine Coatings Inc., which is a fluorine resin (PVDF/AR)-based coating material. Carbon black is a coloring pigment. The vol % described above is a proportion relative to the solid content in the intercoat coating material.

Also, silica particles 1 described above (silica 1) are a classified material or its mixture, for example, and have a particle size distribution like the normal distribution. The number average particle diameter R1 of the silica particles 1 is 7.0 μm, and $D1_{97.5}$ in the number particle size distribution is 22.0 μm. Additionally, the upper limit particle diameter Ru in the number particle size distribution is 23.5 μm.

The following ingredients were mixed in the following amounts to thereby obtain an overcoat coating material.

| | |
|---|---|
| Carbon black | 7 vol % |
| Silica particles 1 | 5 vol % |
| Acrylic particles 1 | 5 vol % |
| Clear coating material 1 | Balance |

The clear coating material 1 described above is "DIC-FLUOR C" manufactured by Nippon Fine Coatings Co., Ltd., which is a fluorine resin (PVDF/AR)-based coating material. Carbon black is a coloring pigment. The vol % described below is a proportion relative to the solid content in the overcoat coating material.

Acrylic particles 1 described above (acrylic 1) have a particle size distribution like the normal distribution. Acrylic particles 1, which have been produced by suspension polymerization, correspond to the aforementioned primary particles. The number average particle diameter R2 of acrylic particles 1 is 35 μm, and $D2_{97.5}$ in the number particle size distribution is 50 μm.

[Production of Coated Metal Sheet 1]

The overcoat coating material was applied to the surface of the undercoat coating film of base sheet 3. Base sheet 3 was heated such that the temperature of the plated steel sheet in base sheet 3 reached 220° C. to thereby produce an overcoat coating film having a dry film thickness T of 25 μm. Coated metal sheet 1 was thus produced.

Incidentally, coated metal sheet 1 was cut to allow its cross section to be exposed. The cross section was encapsulated inside a mass of epoxy resin, further ground, and photographed with a scanning electron microscope. The resulting images of a plurality of spots were processed and analyzed to determine the particle size distribution of silica particles 1 and acrylic particles 1. R1, R2, $D1_{97.5}$, $D2_{97.5}$, and Ru were confirmed to be substantially equivalent to the numerical values.

[Production of Coated Metal Sheets 2 and 3]

Coated metal sheet 2 was produced in the same manner as coated metal sheet 1 except that the amount of the overcoat coating material deposited was changed such that the dry film thickness T reached 22 μm. Additionally, coated metal sheet 3 was produced in the same manner as coated metal sheet 1 except that the amount of the overcoat coating material deposited was changed such that the dry film thickness T reached 20 μm.

[Production of Coated Metal Sheet 4]

Coated metal sheet 4 was produced in the same manner as coated metal sheet 1 except that silica particles 2 were used instead of silica particles 1 as the gloss adjusting agent in the overcoat coating material, acrylic particles 2 were used instead of acrylic particles 1 as the matting agent, and the amount of the overcoat coating material coated was changed such that the dry film thickness T reached 3 μm. Silica particles 2 are a classified material or its mixture, for example, wherein R1 is 1.0 μm, $D1_{97.5}$ is 2.0 μm, and Ru is 2.6 μm. The number average particle diameter R2 of acrylic particles 2 is 10 μm, and $D2_{97.5}$ in the number particle size distribution is 15 μm.

[Production of Coated Metal Sheet 5]

Coated metal sheet 5 was produced in the same manner as coated metal sheet 4 except that the amount of the overcoat coating material coated was changed such that the dry film thickness T reached 2 μm.

[Production of Coated Metal Sheets 6 and 7]

Coated metal sheet 6 was produced in the same manner as coated metal sheet 1 except that silica particles 3 were used instead of silica particles 1 as the gloss adjusting agent in the overcoat coating material, and the amount of the overcoat coating material coated was changed such that the dry film thickness T reached 40 μm. Silica particles 3 are a classified material or its mixture, for example, wherein R1 is 5.0 μm, $D1_{97.5}$ is 7.6 μm, and Ru is 9.5 μm. Additionally, coated metal sheet 7 was produced in the same manner as coated metal sheet 6 except that the amount of the overcoat coating material coated was changed such that the dry film thickness T reached 41 μm.

[Production of Coated Metal Sheets 8 to 11]

Coated metal sheet 8 was produced in the same manner as coated metal sheet 1 except that silica particles 4 were used instead of silica particles 1 as the gloss adjusting agent in the overcoat coating material. Silica particles 4 are a classified material or its mixture, for example, wherein R1 is 8.2 μm, $D1_{97.5}$ is 22.0 μm, and Ru is 31.3 μm.

Additionally, coated metal sheet 9 was produced in the same manner as coated metal sheet 1 except that silica particles 5 were used instead of silica particles 1 as the gloss adjusting agent in the overcoat coating material. Silica particles 5 are a classified material or its mixture, for example, wherein R1 is 8.5 μm, $D1_{97.5}$ is 22.8 μm, and Ru is 28.0 μm.

Additionally, coated metal sheet 10 was produced in the same manner as coated metal sheet 1 except that silica particles 6 were used instead of silica particles 1 as the gloss adjusting agent in the overcoat coating material. Silica particles 6 are a classified material or its mixture, for example, wherein R1 is 3.7 μm, $D1_{97.5}$ is 5.4 μm, and Ru is 7.0 μm.

Additionally, coated metal sheet 11 was produced in the same manner as coated metal sheet 1 except that silica particles 7 were used instead of silica particles 1 as the gloss adjusting agent in the overcoat coating material. Silica particles 7 are a classified material or its mixture, for example, wherein R1 is 0.7 μm, $D1_{97.5}$ is 1.4 μm, and Ru is 2.0 μm.

[Production of Coated Metal Sheet 12]

Coated metal sheet 12 was produced in the same manner as coated metal sheet 1 except that silica particles 8 were used instead of silica particles 1 as the gloss adjusting agent in the overcoat coating material, and the content of the silica particles in the overcoat coating material was changed to 0.0005 vol %. Silica particles 8 are a classified material or its mixture, for example, wherein R1 is 7.0 μm, $D1_{97.5}$ is 12.3 μm, and Ru is 20.0 μm.

[Production of Coated Metal Sheets 13 to 18]

Coated metal sheet 13 was produced in the same manner as coated metal sheet 12 except that the content of the silica particles in the overcoat coating material was changed to 0.01 vol %. Additionally, coated metal sheet 14 was produced in the same manner as coated metal sheet 12 except that the content of the silica particles in the overcoat coating material was changed to 0.1 vol %. Additionally, coated metal sheet 15 was produced in the same manner as coated metal sheet 12 except that the content of the silica particles in the overcoat coating material was changed to 5 vol %. Additionally, coated metal sheet 16 was produced in the same manner as coated metal sheet 12 except that the content of the silica particles in the overcoat coating material was changed to 15 vol %. Additionally, coated metal sheet 17 was produced in the same manner as coated metal sheet 12 except that the content of the silica particles in the overcoat coating material was changed to 16 vol %. Furthermore, coated metal sheet 18 was produced in the same manner as coated metal sheet 12 except that the content of the silica particles in the overcoat coating material was changed to 20 vol %.

[Production of Coated Metal Sheets 19 to 24]

Coated metal sheet 19 was produced in the same manner as coated metal sheet 15 except that acrylic particles 3 were used instead of acrylic particles 1 as the matting agent in the overcoat coating material. Acrylic particles 3, which have been produced by suspension polymerization, correspond to the aforementioned primary particles. In acrylic particles 3, R2 is 8.0 μm, and $D2_{97.5}$ is 12.0 μm.

Additionally, coated metal sheet 20 was produced in the same manner as coated metal sheet 15 except that acrylic particles 4 were used instead of acrylic particles 1 as the matting agent in the overcoat coating material. Acrylic particles 4, which have been produced by suspension polymerization, correspond to the aforementioned primary particles. In acrylic particles 4, R2 is 7.0 μm, and $D2_{97.5}$ is 12.5 μm.

Additionally, coated metal sheet 21 was produced in the same manner as coated metal sheet 15 except that acrylic particles 5 were used instead of acrylic particles 1 as the matting agent in the overcoat coating material. Acrylic particles 5, which have been produced by suspension polymerization, correspond to the aforementioned primary particles. In acrylic particles 5, R2 is 18.0 μm, and $D2_{97.5}$ is 25.0 μm.

Additionally, coated metal sheet 22 was produced in the same manner as coated metal sheet 15 except that acrylic particles 6 were used instead of acrylic particles 1 as the matting agent in the overcoat coating material. Acrylic particles 6, which have been produced by suspension polymerization, correspond to the aforementioned primary particles. In acrylic particles 6, R2 is 80.0 μm, and $D2_{97.5}$ is 120.0 μm.

Additionally, coated metal sheet 23 was produced in the same manner as coated metal sheet 15 except that acrylic particles 7 were used instead of acrylic particles 1 as the matting agent in the overcoat coating material. Acrylic particles 7, which have been produced by suspension polymerization, correspond to the aforementioned primary particles. In acrylic particles 7, R2 is 120.0 μm, and $D2_{97.5}$ is 200.0 μm.

Additionally, coated metal sheet 24 was produced in the same manner as coated metal sheet 15 except that polyacrylonitrile (PAN) particles 1 were used instead of acrylic particles 1 as the matting agent in the overcoat coating material. PAN particles 1, which have been produced by a spray dry method, correspond to the aforementioned microporous particles. R2 is 23.0 μm, $D2_{97.5}$ is 55.0 μm.

[Production of Coated Metal Sheets 25 to 31]

Coated metal sheet 25 was produced in the same manner as coated metal sheet 15 except that the content of the acrylic particles in the overcoat coating material was changed to 0.0005 vol %. Additionally, coated metal sheet 26 was produced in the same manner as coated metal sheet 15 except that the content of the acrylic particles in the overcoat coating material was changed to 0.01 vol %. Additionally, Coated metal sheet 27 was produced in the same manner as coated metal sheet 15 except that the content of the acrylic particles in the overcoat coating material was changed to 0.1 vol %. Additionally, coated metal sheet 28 was produced in the same manner as coated metal sheet 15 except that the content of the acrylic particles in the overcoat coating material was changed to 13.0 vol %. Additionally, coated metal sheet 29 was produced in the same manner as coated metal sheet 15 except that the content of the acrylic particles in the overcoat coating material was changed to 15.0 vol %. Additionally, coated metal sheet 30 was produced in the same manner as coated metal sheet 15 except that the content of the acrylic particles in the overcoat coating material was changed to 16.0 vol %. Furthermore, coated metal sheet 31 was produced in the same manner as coated metal sheet 15 except that the content of the acrylic particles in the overcoat coating material was changed to 20.0 vol %.

[Production of Coated Metal Sheets 32 to 34]

Coated metal sheet 32 was produced in the same manner as coated metal sheet 15 except that the overcoat coating film was formed on base sheet 1 instead of on base sheet 3. Additionally, coated metal sheet 33 was produced in the same manner as coated metal sheet 15 except that the overcoat coating film was formed on base sheet 2 instead of on base sheet 3. Additionally, coated metal sheet 34 was produced in the same manner as coated metal sheet 15 except that the overcoat coating film was formed on base sheet 4 instead of on base sheet 3.

[Production of Coated Metal Sheets 35 to 39]

Coated metal sheet 35 was produced in the same manner as coated metal sheet 34 except that silica particles 9 were used instead of silica particles 1 as the gloss adjusting agent in the overcoat coating material. Silica particles 9 are a classified material or its mixture, for example, wherein R1 is 7.0 μm, $D1_{97.5}$ is 12.7 μm, and Ru is 23.3 μm.

Coated metal sheet 36 was produced in the same manner as coated metal sheet 34 except that silica particles 10 were used instead of silica particles 1 as the gloss adjusting agent in the overcoat coating material. Silica particles 10 are a classified material or its mixture, for example, wherein R1 is 8.0 μm, $D1_{97.5}$ is 15.3 μm, and Ru is 24.7 μm.

Coated metal sheet 37 was produced in the same manner as coated metal sheet 15 except that silica particles 11 were used instead of silica particles 1 as the gloss adjusting agent in the overcoat coating material. Silica particles 11 are a classified material or its mixture, for example, wherein R1 is 5.0 μm, $D1_{97.5}$ is 10.2 μm, and Ru is 20.0 μm.

Coated metal sheet 38 was produced in the same manner as coated metal sheet 15 except that polyacrylonitrile (PAN) particles 2 were used instead of silica particles 1 as the gloss adjusting agent in the overcoat coating material. PAN particles 2 are a classified material or its mixture, for example, wherein R1 is 5.0 μm, $D1_{97.5}$ is 12.7 μm, and Ru is 15.8 μm.

Coated metal sheet 39 was produced in the same manner as coated metal sheet 15 except that calcium carbonate-calcium phosphate composite (CaCPC) particles were used as the gloss adjusting agent in the overcoat coating material instead of silica particles 15. The CaCPC particles are a classified material or its mixture, for example, wherein R1 is 5.0 μm, $D1_{97.5}$ is 12.7 μm, and Ru is 15.8 μm.

[Production of Coated Metal Sheet 40]

Coated metal sheet 40 was produced in the same manner as coated metal sheet 37 except that glass particles were used instead of acrylic particles 1 as the matting agent in the overcoat coating material. The glass particles correspond to the aforementioned primary particles. In the glass particles, R2 is 20.0 μm, and $D2_{97.5}$ is 30.0 μm.

[Production of Coated Metal Sheet 41]

Coated metal sheet 41 was produced in the same manner as coated metal sheet 1 except that the overcoat coating film was formed on base sheet 5 instead of on base sheet 3, the amount of the overcoat coating material coated was changed such that the dry film thickness T reached 10 μm, and silica particles 12 were used instead of silica particles 1 as the gloss adjusting agent in the overcoat coating material. Silica particles 12 are a classified material or its mixture, for example, wherein R1 is 3.0 µm, $D1_{97.5}$ is 6.1 µm, and Ru is 12.0 µm.

[Evaluation]

Coated metal sheets 1 to 41 were each subjected to the measurement and test described below.

(1) 60° Glossiness (G60)

The specular glossiness at 60° (G60), specified by JISK5600-4-7 (ISO2813: 1994), of each of coated metal sheets 1 to 41 was measured with Gloss meter VG-2000 manufactured by NIPPON DENSHOKU INDUSTRIES CO., LTD.

(2) Coating Appearance

The appearance of the overcoat coating film of each of coated metal sheets 1 to 41 after drying was evaluated in accordance with the following criteria.

(Evaluation Criteria)

G: No abnormal glossiness and coating film defects are observed, the coating film is flat, and a matte appearance is observed.

NG1: The gloss is extremely high, and no matte appearance is obtained (the glossiness is higher than 15).

NG2: Concealability is lacking.

(3) Scratch Resistance

Clemens-type scratch test was conducted each on coated metal sheets 1 to 41 by using a diamond needle having a diameter of 125 µm and applying a load of 400 g, and evaluation was made in accordance with the following criteria.

(Evaluation Criteria)

G: No scratch reaching the base material (metal sheet) is observed.

NG: Scratches reaching the base material (metal sheet) are observed.

(4) Processed Part Adhesiveness

Coated metal sheets 1 to 41 after 24 hours elapsed since their production were each subjected to 2T bending (adhesion bending), and the 2T bended portion was subjected to cellophane tape-peeling test and evaluated in accordance with the following criteria on the basis of the area ratio (%) of the peeled portion to the portion subjected to the test in the overcoat coating film.

(Evaluation Criteria)

A: No crack in the coating film is observed (0%).

B: 3% or less of cracks in the coating film

C: 5% or less of cracks in the coating film

NG: More than 5% of peeling in the coating film is observed.

(5) Flat Portion-Corrosion Resistance

First, coated metal sheets 1 to 41 were each subjected to the xenon lamp method-accelerated weathering test specified by JIS K5600-7-7 (ISO11341: 2004) for 1,000 hours. Then, each sheet was subjected to the "neutral salt water spray cycle test" specified by JIS H8502 (so-called JASO method) for 720 hours. The above-described two tests were conducted as one cycle. Test products subjected to one cycle (corresponding to about five-year service life in actual use) and test products subjected to two cycles (corresponding to about 10-year service life) each for coated metal sheets 1 to 41 were washed with water. After observed for the presence or absence of coating film blistering at the flat portion of the coated metal sheet by visual observation and magnified observation with a loupe having a magnification of 10, the sheets were evaluated in accordance with the following criteria. A or B would have no practical problem in use.

(Evaluation Criteria)

A: No blistering is observed.

B: Slightly subtle blistering is observed by magnified observation, but no blistering is visually observed.

C: Blistering is visually observed.

The base sheet type, the gloss adjusting agent type, the matting agent type, R1, R2, $D1_{97.5}$, $D2_{97.5}$, Ru, T, the content of the gloss adjusting agent, the content of the matting agent, the value of $D1_{97.5}/T$, the value of $D2_{97.5}/T$, the value of Ru/T, and Example/Comparative Example of coated metal sheets 1 to 41 are shown in Table 1 and Table 2. The evaluation results of coated metal sheets 1 to 41 are also shown in Table 3 and Table 4.

TABLE 1

| No. | Base sheet | Overcoat T (µm) | Gloss adjusting agent Type | R1 (µm) | $D1_{97.5}$ (µm) | Ru (µm) | Content (vol %) | $D1_{97.5}/T$ | Ru/T | Matting agent Type | R2 (µm) | $D2_{97.5}$ (µm) | Content (vol %) | $D2_{97.5}/T$ | Primary particles/ Microporous particles | Category |
|---|---|---|---|---|---|---|---|---|---|---|---|---|---|---|---|---|
| 1 | 3 | 25 | Silica 1 | 7 | 22 | 23.5 | 5 | 0.88 | 0.9 | Acrylic 1 | 35 | 50 | 5 | 2.0 | Primary particles | Example |
| 2 | 3 | 22 | Silica 1 | 7 | 22 | 23.5 | 5 | 1.0 | 1.1 | Acrylic 1 | 35 | 50 | 5 | 2.3 | Primary particles | Comparative Example |
| 3 | 3 | 20 | Silica 1 | 7 | 22 | 23.5 | 5 | 1.1 | 1.18 | Acrylic 1 | 35 | 50 | 5 | 2.5 | Primary particles | Comparative Example |
| 4 | 3 | 3 | Silica 2 | 1 | 2 | 2.6 | 5 | 0.7 | 0.9 | Acrylic 2 | 10 | 15 | 5 | 5.0 | Primary particles | Example |
| 5 | 3 | 2 | Silica 2 | 1 | 2 | 2.6 | 5 | 1.0 | 1.3 | Acrylic 2 | 10 | 15 | 5 | 7.5 | Primary particles | Comparative Example |
| 6 | 3 | 40 | Silica 3 | 5 | 7.6 | 9.5 | 5 | 0.2 | 0.2 | Acrylic 1 | 35 | 50 | 5 | 1.3 | Primary particles | Example |
| 7 | 3 | 41 | Silica 3 | 5 | 7.6 | 9.5 | 5 | 0.2 | 0.2 | Acrylic 1 | 35 | 50 | 5 | 1.2 | Primary particles | Comparative Example |
| 8 | 3 | 25 | Silica 4 | 8.2 | 22 | 31.3 | 5 | 0.88 | 1.25 | Acrylic 1 | 35 | 50 | 5 | 2.0 | Primary particles | Comparative Example |
| 9 | 3 | 25 | Silica 5 | 8.5 | 22.8 | 28 | 5 | 0.91 | 1.1 | Acrylic 1 | 35 | 50 | 5 | 2.0 | Primary particles | Comparative Example |
| 10 | 3 | 25 | Silica 6 | 3.7 | 5.4 | 7 | 5 | 0.2 | 0.3 | Acrylic 1 | 35 | 50 | 5 | 2.0 | Primary particles | Example |
| 11 | 3 | 25 | Silica 7 | 0.7 | 1.4 | 2 | 5 | 0.1 | 0.1 | Acrylic 1 | 35 | 50 | 5 | 2.0 | Primary particles | Comparative Example |
| 12 | 3 | 25 | Silica 8 | 7 | 12.3 | 20 | 0.0005 | 0.5 | 0.8 | Acrylic 1 | 35 | 50 | 5 | 2.0 | Primary particles | Comparative Example |

TABLE 1-continued

| | | | Gloss adjusting agent | | | | | | | Matting agent | | | | | | |
|---|---|---|---|---|---|---|---|---|---|---|---|---|---|---|---|---|
| No. | Base sheet | Over-coat T (μm) | Type | R1 (μm) | D1$_{97.5}$ (μm) | Ru (μm) | Content (vol %) | D1$_{97.5}$/T | Ru/T | Type | R2 (μm) | D2$_{97.5}$ (μm) | Content (vol %) | D2$_{97.5}$/T | Primary particles/ Microporous particles | Category |
| 13 | 3 | 25 | Silica 8 | 7 | 12.3 | 20 | 0.01 | 0.5 | 0.8 | Acrylic 1 | 35 | 50 | 5 | 2.0 | Primary particles | Example |
| 14 | 3 | 25 | Silica 8 | 7 | 12.3 | 20 | 0.1 | 0.5 | 0.8 | Acrylic 1 | 35 | 50 | 5 | 2.0 | Primary particles | Example |
| 15 | 3 | 25 | Silica 8 | 7 | 12.3 | 20 | 5 | 0.5 | 0.8 | Acrylic 1 | 35 | 50 | 5 | 2.0 | Primary particles | Example |
| 16 | 3 | 25 | Silica 8 | 7 | 12.3 | 20 | 15 | 0.5 | 0.8 | Acrylic 1 | 35 | 50 | 5 | 2.0 | Primary particles | Example |
| 17 | 3 | 25 | Silica 8 | 7 | 12.3 | 20 | 16 | 0.5 | 0.8 | Acrylic 1 | 35 | 50 | 5 | 2.0 | Primary particles | Comparative Example |
| 18 | 3 | 25 | Silica 8 | 7 | 12.3 | 20 | 20 | 0.5 | 0.8 | Acrylic 1 | 35 | 50 | 5 | 2.0 | Primary particles | Comparative Example |
| 19 | 3 | 25 | Silica 8 | 7 | 12.3 | 20 | 5 | 0.5 | 0.8 | Acrylic 3 | 8 | 12 | 5 | 0.48 | Primary particles | Comparative Example |
| 20 | 3 | 25 | Silica 8 | 7 | 12.3 | 20 | 5 | 0.5 | 0.8 | Acrylic 4 | 7 | 12.5 | 5 | 0.5 | Primary particles | Example |
| 21 | 3 | 25 | Silica 8 | 7 | 12.3 | 20 | 5 | 0.5 | 0.8 | Acrylic 5 | 18 | 25 | 5 | 1.0 | Primary particles | Example |
| 22 | 3 | 25 | Silica 8 | 7 | 12.3 | 20 | 5 | 0.5 | 0.8 | Acrylic 6 | 80 | 120 | 5 | 4.8 | Primary particles | Example |

TABLE 2

| | | | Gloss adjusting agent | | | | | | | Matting agent | | | | | Primary particles/ Microporous particles | |
|---|---|---|---|---|---|---|---|---|---|---|---|---|---|---|---|---|
| No. | Base sheet | Over-coat T (μm) | Type | R1 (μm) | D1$_{97.5}$ (μm) | Ru (μm) | Content (vol %) | D1$_{97.5}$/T | Ru/T | Type | R2 (μm) | D2$_{97.5}$ (μm) | Content (vol %) | D2$_{97.5}$/T | | Category |
| 23 | 3 | 25 | Silica 8 | 7 | 12.3 | 20 | 5 | 0.5 | 0.8 | Acrylic 7 | 120 | 200 | 5 | 8.0 | Primary particles | Comparative Example |
| 24 | 3 | 25 | Silica 8 | 7 | 12.3 | 20 | 5 | 0.5 | 0.8 | PAN1 | 23 | 55 | 5 | 2.2 | Microporous particles | Comparative Example |
| 25 | 3 | 25 | Silica 8 | 7 | 12.3 | 20 | 5 | 0.5 | 0.8 | Acrylic 1 | 35 | 50 | 0.0005 | 2.0 | Primary particles | Comparative Example |
| 26 | 3 | 25 | Silica 8 | 7 | 12.3 | 20 | 5 | 0.5 | 0.8 | Acrylic 1 | 35 | 50 | 0.01 | 2.0 | Primary particles | Example |
| 27 | 3 | 25 | Silica 8 | 7 | 12.3 | 20 | 5 | 0.5 | 0.8 | Acrylic 1 | 35 | 50 | 0.1 | 2.0 | Primary particles | Example |
| 28 | 3 | 25 | Silica 8 | 7 | 12.3 | 20 | 5 | 0.5 | 0.8 | Acrylic 1 | 35 | 50 | 13 | 2.0 | Primary particles | Example |
| 29 | 3 | 25 | Silica 8 | 7 | 12.3 | 20 | 5 | 0.5 | 0.8 | Acrylic 1 | 35 | 50 | 15 | 2.0 | Primary particles | Example |
| 30 | 3 | 25 | Silica 8 | 7 | 12.3 | 20 | 5 | 0.5 | 0.8 | Acrylic 1 | 35 | 50 | 16 | 2.0 | Primary particles | Comparative Example |
| 31 | 3 | 25 | Silica 8 | 7 | 12.3 | 20 | 5 | 0.5 | 0.8 | Acrylic 1 | 35 | 50 | 20 | 2.0 | Primary particles | Comparative Example |
| 32 | 1 | 25 | Silica 8 | 7 | 12.3 | 20 | 5 | 0.5 | 0.8 | Acrylic 1 | 35 | 50 | 5 | 2.0 | Primary particles | Example |
| 33 | 2 | 25 | Silica 8 | 7 | 12.3 | 20 | 5 | 0.5 | 0.8 | Acrylic 1 | 35 | 50 | 5 | 2.0 | Primary particles | Example |
| 34 | 4 | 25 | Silica 8 | 7 | 12.3 | 20 | 5 | 0.5 | 0.8 | Acrylic 1 | 35 | 50 | 5 | 2.0 | Primary particles | Example |
| 35 | 4 | 25 | Silica 9 | 7 | 12.7 | 23.3 | 5 | 0.5 | 0.9 | Acrylic 1 | 35 | 50 | 5 | 2.0 | Primary particles | Example |
| 36 | 4 | 25 | Silica 10 | 8 | 15.3 | 24.7 | 5 | 0.6 | 1.0 | Acrylic 1 | 35 | 50 | 5 | 2.0 | Primary particles | Example |

TABLE 2-continued

| | | | Gloss adjusting agent | | | | | | Matting agent | | | | Primary particles/ Micro- porous particles | Category |
|---|---|---|---|---|---|---|---|---|---|---|---|---|---|---|---|
| No. | Base sheet | Over- coat T (μm) | Type | R1 (μm) | $D1_{97.5}$ (μm) | Ru (μm) | Con- tent (vol %) | $D1_{97.5}/T$ | Ru/T | Type | R2 (μm) | $D2_{97.5}$ (μm) | Con- tent (vol %) | $D2_{97.5}/T$ | |
| 37 | 3 | 25 | Silica 11 | 5 | 10.2 | 20 | 5 | 0.4 | 0.8 | Acrylic 1 | 35 | 50 | 5 | 2.0 | Primary particles | Example |
| 38 | 3 | 25 | PAN2 | 5 | 12.7 | 15.8 | 5 | 0.5 | 0.6 | Acrylic 1 | 35 | 50 | 5 | 2.0 | Primary particles | Example |
| 39 | 3 | 25 | CaCPC | 5 | 12.7 | 15.8 | 5 | 0.5 | 0.6 | Acrylic 1 | 35 | 50 | 5 | 2.0 | Primary particles | Example |
| 40 | 3 | 25 | Silica 11 | 5 | 10.2 | 20 | 5 | 0.4 | 0.8 | Glass | 20 | 30 | 5 | 1.2 | Primary particles | Example |
| 41 | 5 | 10 | Silica 12 | 3 | 6.1 | 12 | 5 | 0.6 | 1.20 | Acrylic 1 | 35 | 50 | 5 | 5.0 | Primary particles | Example |

TABLE 3

| No. | Coating G60 appearance | Scratch resistance | Processed part adhesiveness | Flat-portion corrosion resistance | | Category |
|---|---|---|---|---|---|---|
| | | | | 1 cycle | 2 cycles | |
| 1 | 10 | G | G | C | A | A | Example |
| 2 | 9 | G | G | C | B | C | Comparative Example |
| 3 | 8 | G | G | C | B | C | Comparative Example |
| 4 | 13 | G | G | B | A | A | Example |
| 5 | 5 | NG2 | NG | C | — | — | Comparative Example |
| 6 | 15 | G | G | A | A | A | Example |
| 7 | 16 | NG1 | G | A | — | — | Comparative Example |
| 8 | 5 | G | G | C | B | C | Comparative Example |
| 9 | 6 | G | G | C | B | C | Comparative Example |
| 10 | 15 | G | G | A | A | A | Example |
| 11 | 16 | NG1 | G | A | — | — | Comparative Example |
| 12 | 16 | NG1 | G | A | — | — | Comparative Example |
| 13 | 15 | G | G | A | A | A | Example |
| 14 | 15 | G | G | A | A | A | Example |
| 15 | 8 | G | G | A | A | A | Example |
| 16 | 2 | G | G | A | A | B | Example |
| 17 | 1 | G | G | NG | — | — | Comparative Example |
| 18 | 0.2 | G | G | NG | — | — | Comparative Example |
| 19 | 12 | G | NG | A | — | — | Comparative Example |
| 20 | 12 | G | G | A | A | A | Example |
| 21 | 8 | G | G | A | A | A | Example |
| 22 | 4 | G | G | A | A | A | Example |

TABLE 4

| No. | G60 | Coating appearance | Scratch resistance | Processed part adhesiveness | Flat-portion corrosion resistance 1 cycle | 2 cycles | Category |
|---|---|---|---|---|---|---|---|
| 23 | 2 | G | G | NG | — | — | Comparative Example |
| 24 | 8 | G | G | A | B | C | Comparative Example |
| 25 | 18 | NG1 | NG | A | — | — | Comparative Example |
| 26 | 15 | G | G | A | A | A | Example |
| 27 | 12 | G | G | A | A | A | Example |
| 28 | 5 | G | G | A | A | A | Example |
| 29 | 3 | G | G | A | A | A | Example |
| 30 | 1 | G | G | NG | — | — | Comparative Example |
| 31 | 0.4 | G | G | NG | — | — | Comparative Example |
| 32 | 8 | G | G | A | B | B | Example |
| 33 | 8 | G | G | A | A | B | Example |
| 34 | 8 | G | G | A | A | A | Example |
| 35 | 8 | G | G | A | A | A | Example |
| 36 | 7 | G | G | B | A | A | Example |
| 37 | 8 | G | G | A | A | A | Example |
| 38 | 8 | G | G | A | A | A | Example |
| 39 | 8 | G | G | A | A | A | Example |
| 40 | 8 | G | G | A | A | A | Example |
| 41 | 5 | G | G | B | A | A | Example |

(6) Flat Portion-Corrosion Resistance

Coated metal sheets 15, 34, 35, and 36 were each subjected to up to three cycles of the aforementioned test according to flat portion-corrosion resistance (corresponding to about 15-year service life in actual use), and test products subjected to three cycles were each washed with water. After observed for the presence or absence of coating film blistering at the flat portion of the coated metal sheet by visual observation and magnified observation with a loupe having a magnification of 10, the sheets were evaluated in accordance with the aforementioned criteria. The results are shown in Table 5.

TABLE 5

| Coated metal sheet No. | Flat-portion corrosion resistance 1 cycle | 2 cycles | 3 cycles | Category |
|---|---|---|---|---|
| 15 | A | A | B | Example |
| 34 | A | A | A | Example |
| 35 | A | A | A | Example |
| 36 | A | A | A | Example |

Reference Experiment 1

Particles having a particle diameter R1' of 0.7T μm (T=25 μm) or more were removed from silica particles 1 to obtain silica particles 1 substantially containing no particles of 17.5 μm or more. These particles are referred to as silica particles 13. Then, coated metal sheet 42 was produced in the same manner as coated metal sheet 1 except that silica particles 13 were used instead of silica particles 1 as the gloss adjusting agent in the overcoat coating material.

Additionally, particles having a particle diameter R1' of 0.8T μm (20.0 μm) or more were removed to separately provide silica particles A substantially containing no particles of 20.0 μm or more. Into 97.5 parts by volume of silica particles 13, 2.5 parts by volume of silica particles A was mixed to obtain silica particles composed of 97.5 parts by volume of silica particles 13 of 0.7T or less and 2.5 parts by volume of silica particles A of 0.8T or less (content ratio: 97.5/2.5). These particles are referred to as silica particles 14. Then, coated metal sheet 43 was produced in the same manner as coated metal sheet 1 except that silica particles 14 were used instead of silica particles 1 as the gloss adjusting agent in the overcoat coating material.

Additionally, particles having a particle diameter R1' of 0.9T μm (22.5 μm) or more were removed to separately provide silica particles B substantially containing no particles of 22.5 μm or more. Into 97.5 parts by volume of silica particles 13, 2.5 parts by volume of silica particles B was mixed to obtain silica particles composed of 97.5 parts by volume of silica particles 13 of 0.7T or less and 2.5 parts by volume of silica particles B of 0.9T or less. These particles are referred to as silica particles 15. Then, coated metal sheet 44 was produced in the same manner as coated metal sheet 1 except that silica particles 15 were used instead of silica particles 1 as the gloss adjusting agent in the overcoat coating material.

Additionally, particles having a particle diameter R1' of 1.0T μm (25.0 μm) or more were removed to separately provide silica particles C substantially containing no particles of 25.0 μm or more. Into 97.5 parts by volume of silica particles 13, 2.5 parts by volume of silica particles C was mixed to obtain silica particles composed of 97.5 parts by volume of silica particles 13 of 0.7T or less and 2.5 parts by volume of silica particles C of 1.0T or less. These particles are referred to as silica particles 16. Then, coated metal sheet 45 was produced in the same manner as coated metal sheet 1 except that silica particles 16 were used instead of silica particles 1 as the gloss adjusting agent in the overcoat coating material.

Additionally, particles having a particle diameter R1' of 1.1T µm (27.5 µm) or more were removed to separately provide silica particles D substantially containing no particles of 27.5 µm or more. Into 97.5 parts by volume of silica particles 13, 2.5 parts by volume of silica particles D was mixed to obtain silica particles composed of 97.5 parts by volume of silica particles 13 of 0.7T or less and 2.5 parts by volume of silica particles D of 1.1T or less. These particles are referred to as silica particles 17. Then, coated metal sheet 46 was produced in the same manner as coated metal sheet 1 except that silica particles 17 were used instead of silica particles 1 as the gloss adjusting agent in the overcoat coating material.

Additionally, particles having a particle diameter R1' of 1.2T µm (30.0 µm) or more were removed to separately provide silica particles E substantially containing no particles of 30.0 µm or more. Into 97.5 parts by volume of silica particles 13, 2.5 parts by volume of silica particles E was mixed to obtain silica particles composed of 97.5 parts by volume of silica particles 13 of 0.7T or less and 2.5 parts by volume of silica particles E of 1.2T or less. These particles are referred to as silica particles 18. Then, coated metal sheet 47 was produced in the same manner as coated metal sheet 1 except that silica particles 18 were used instead of silica particles 1 as the gloss adjusting agent in the overcoat coating material.

Additionally, particles having a particle diameter R1' of 1.3T µm (32.5 µm) or more were removed to separately provide silica particles F substantially containing no particles of 32.5 µm or more. Into 97.5 parts by volume of silica particles 13, 2.5 parts by volume of silica particles F was mixed to obtain silica particles composed of 97.5 parts by volume of silica particles 13 of 0.7T or less and 2.5 parts by volume of silica particles F of 1.3T or less. These particles are referred to as silica particles 19. Then, coated metal sheet 48 was produced in the same manner as coated metal sheet 1 except that silica particles 19 were used instead of silica particles 1 as the gloss adjusting agent in the overcoat coating material.

Coated metal sheets 42 to 48 were evaluated for flat portion-corrosion resistance in accordance with the aforementioned method. The base sheet type, the gloss adjusting agent type, the matting agent type, R1, R2, $D1_{97.5}$, $D2_{97.5}$, the cut value, the particle diameter R1' of the main component of the silica particles added, T, the content of the gloss adjusting agent, the content of the matting agent, the content ratio of two types of silica particles, and evaluation results of flat portion-corrosion resistance of coated metal sheets 42 to 48 are shown in Table 6.

TABLE 6

| | | | Gloss adjusting agent | | | | | | | Matting agent | | | | | Flat portion-corrosion resistance | |
|---|---|---|---|---|---|---|---|---|---|---|---|---|---|---|---|---|
| No. | Base sheet | Overcoat T (µm) | Type | R1 (µm) | $D1_{97.5}$ (µm) | Cut value (µm) | R1' | Content (vol %) | Content ratio | Type | R2 (µm) | $D2_{97.5}$ (µm) | Content (vol %) | $D2_{97.5}/T$ | Primary particles/ Microporous particles | 1 cycle | 2 cycles |
| 42 | 3 | 25 | Silica 13 | 7 | 22 | 23.5 | — | 5 | 100/0 | Acrylic 1 | 35 | 50 | 5 | 2.0 | Primary particles | A | A |
| 43 | 3 | 25 | Silica 14 | 7 | 22 | 23.5 | 20.0 | 5 | 97.5/2.5 | Acrylic 1 | 35 | 50 | 5 | 2.0 | Primary particles | A | A |
| 44 | 3 | 25 | Silica 15 | 7 | 22 | 23.5 | 22.5 | 5 | 97.5/2.5 | Acrylic 1 | 35 | 50 | 5 | 2.0 | Primary particles | A | A |
| 45 | 3 | 25 | Silica 16 | 7 | 22 | 23.5 | 25.0 | 5 | 97.5/2.5 | Acrylic 1 | 35 | 50 | 5 | 2.0 | Primary particles | A | B |
| 46 | 3 | 25 | Silica 17 | 7 | 22 | 23.5 | 27.5 | 5 | 97.5/2.5 | Acrylic 1 | 35 | 50 | 5 | 2.0 | Primary particles | B | B |
| 47 | 3 | 25 | Silica 18 | 7 | 22 | 23.5 | 30.0 | 5 | 97.5/2.5 | Acrylic 1 | 35 | 50 | 5 | 2.0 | Primary particles | B | B |
| 48 | 3 | 25 | Silica 19 | 7 | 22 | 23.5 | 32.5 | 5 | 97.5/2.5 | Acrylic 1 | 35 | 50 | 5 | 2.0 | Primary particles | B | C |

Reference Experiment 2

Silica particles composed of 97.0 parts by volume of silica particles 8 of 0.7T or less and 3.0 parts by volume of silica particles E of 1.2T or less were obtained by changing the content ratio between silica particles 13 and silica particles E in silica particles 18. These particles are referred to as silica particles 20. Then, coated metal sheet 49 was produced in the same manner as coated metal sheet 1 except that silica particles 20 were used instead of silica particles 1 as the gloss adjusting agent in the overcoat coating material.

Additionally, silica particles composed of 96.5 parts by volume of silica particles 8 of 0.7T or less and 3.5 parts by volume of silica particles E of 1.2T or less were obtained by changing the content ratio between silica particles 13 and silica particles E in silica particles 18. These particles are referred to as silica particles 21. Then, coated metal sheet 50 was produced in the same manner as coated metal sheet 1 except that silica particles 21 were used instead of silica particles 1 as the gloss adjusting agent in the overcoat coating material.

Coated metal sheets 49 and 50 were evaluated for flat portion-corrosion resistance in accordance with the aforementioned two-cycle method. The base sheet type, the gloss adjusting agent type, the matting agent type, R1, R2, $D1_{97.5}$, $D2_{97.5}$, the cut value, the particle diameter R1' of the main component of the silica particles added, T, the content of the gloss adjusting agent, the content of the matting agent, the content ratio of two types of silica particles, and evaluation results of flat portion-corrosion resistance of coated metal sheets 47, 49, and 50 are shown in Table 7.

In contrast, coated metal sheets 2, 3, 8, and 9 had insufficient flat portion-corrosion resistance. It is conceivable that coated metal sheets 2, 3, 8, and 9 had insufficient flat portion-corrosion resistance because the gloss adjusting agent was exposed from the overcoat coating film during the resistance test due to optical degradation of the overcoat coating film.

Furthermore, the coated metal sheets 7, 11, 12, and 25 had an extremely high gloss, and the intended designability (matte feeling) could not be achieved. Thus, it was determined that coated metal sheets 7, 11, 12, and 25 did not deserve to be subject to evaluation test of flat portion-corrosion resistance, and the evaluation test was not conducted. It is conceivable that coated metal sheet 7 had an extremely high gloss because the film thickness of the overcoat coating film was extremely thick, that the coated metal sheet 11 had an extremely high gloss because the particle diameter of the gloss adjusting agent is extremely small, that the coated metal sheet 12 had an extremely high gloss because the content of the gloss adjusting agent was too low to adjust the gloss, and the coated metal sheet 25 had an extremely high gloss because the content of the matting agent was too low to adjust the gloss.

Additionally, coated metal sheet 5 lacked concealability. In other words, the visibility of the overcoat coating film was developed only to the extent where the substrate of the overcoat coating film (undercoat coating film) was visually observed, and the intended designability could not achieved. Thus, it was determined that coated metal sheet 4 did not deserve to be subject to evaluation test of flat portion-corrosion resistance, and the evaluation test was not conducted. It is conceivable that the reason why the above-described concealability was insufficient is that the film thickness of the overcoat coating film was extremely thin as

TABLE 7

| | | | Gloss adjusting agent | | | | | | | Matting agent | | | | | Flat portion-corrosion resistance | |
|---|---|---|---|---|---|---|---|---|---|---|---|---|---|---|---|---|
| | | Overcoat | | | | | Cut | Content | Content | | | | Content | | Primary particles/ | | |
| No. | Base sheet | T (μm) | Type | R1 (μm) | $D1_{97.5}$ (μm) | value (μm) | R1' | (vol %) | tent ratio | Type | R2 (μm) | $D2_{97.5}$ (μm) | (vol %) | $D2_{97.5}$/T | Microporous particles | 1 cycle | 2 cycles |
| 47 | 3 | 25 | Silica 18 | 7 | 22 | 23.5 | 30.0 | 5 | 97.5/ 2.5 | Acrylic 1 | 35 | 50 | 5 | 2.0 | Primary particles | B | B |
| 49 | 3 | 25 | Silica 20 | 7 | 22 | 23.5 | 30.0 | 5 | 97.0/ 3.0 | Acrylic 1 | 35 | 50 | 5 | 2.0 | Primary particles | B | C |
| 50 | 3 | 25 | Silica 21 | 7 | 22 | 23.5 | 30.0 | 5 | 96.5/ 3.5 | Acrylic 1 | 35 | 50 | 5 | 2.0 | Primary particles | B | C |

Reference Experiment 3

Coated metal sheet 51 was produced in the same manner as coated metal sheet 48 except that the overcoat coating material for coated metal sheet 48 was treated with a roller mill under conditions for pulverizing silica particles F before the matting agent was blended. Then, coated metal sheet 51 was evaluated for flat portion-corrosion resistance in accordance with the aforementioned method, and graded B both in the one-cycle test and the two-cycle test.

As clear from Table 1 to Table 4, coated metal sheets 1, 4, 6, 10, 13 to 16, 20 to 22, 26 to 29, and 32 to 41 all have designability of a matte gloss, have sufficient processed-part adhesiveness, and scratch resistance, and additionally have flat portion-corrosion resistance corresponding to 10 years of actual use.

well as the particle diameter of the gloss adjusting agent was extremely large relative to the film thickness T of the overcoat coating film.

Alternatively, coated metal sheets 17, 18, 23, 30, and 31 had insufficient processed-part adhesiveness. Thus, it was not possible to conduct evaluation test of flat portion-corrosion resistance. It is conceivable that coated metal sheets 17 and 18 had insufficient processed-part adhesiveness because the content of the gloss adjusting agent in the overcoat coating film was extremely high, that the coated metal sheet 23 had insufficient processed-part adhesiveness because $D2_{97.5}$/T was extremely large, and that the coated metal sheets 30 and 31 had insufficient processed-part adhesiveness because the content of the matting agent in the overcoat coating film was extremely high.

Alternatively, coated metal sheets 5, 19, and 25 had insufficient scratch resistance. Thus, it was not possible to conduct evaluation test of flat portion-corrosion resistance. It is conceivable that coated metal sheet 5 had insufficient scratch resistance because the film thickness of the overcoat coating film was extremely small, that the coated metal sheet 19 had insufficient scratch resistance because the particle diameter of the matting agent is extremely small relative to the film thickness T of the overcoat coating film, and that coated metal sheet 25 had insufficient scratch resistance because the content of the matting agent was extremely low.

Additionally, coated metal sheets 32 and 33 both exhibited the intended designability (matte) irrespective of the type of the base sheet (configuration such as whether the undercoat coating film is included or not) as well as had sufficient processed part-adhesiveness, scratch resistance, and flat portion-corrosion resistance. It is conceivable that this is because flat portion-corrosion resistance is provided by the overcoat coating film.

Additionally, both coated metal sheets 38 and 39 all exhibited the intended designability (matte) irrespective of the type of the gloss adjusting agent as well as had sufficient processed part-adhesiveness, scratch resistance, and flat portion-corrosion resistance. It is conceivable that this is because even particles having micropores, if not exposed from the surface of the overcoat coating film, would exhibit sufficient flat portion-corrosion resistance, whether the particles are inorganic particles or organic particles.

Coated metal sheet 40 also exhibited the intended designability (matte) irrespective of the type of the matting agent as well as had sufficient processed part-adhesiveness, scratch resistance, and flat portion-corrosion resistance. It is conceivable that this is because primary particles would exhibit sufficient flat portion-corrosion resistance, whether the particles are inorganic particles or organic particles.

Also as clear from Table 5, coated metal sheet 34 had more excellent flat portion-corrosion resistance than coated metal sheet 15, which had the same configuration other than having a chrome-free base sheet. It is conceivable that this is because anti-rust treatment of the base sheet with chromate has improved the corrosion resistance.

The coated metal sheet 41 also exhibited excellent results in any evaluation. It is conceivable that this is because coated metal sheet 41 has an intercoat coating film and thus is provided with designability and functionality from the intercoat coating film, and that, as a result, more excellent properties than the designability and functionality exhibited singly by the overcoat coating film have been exhibited.

Also as clear from Table 4, coated metal sheets 34 to 36 all maintain flat portion-corrosion resistance for a period longer than coated metal sheet 15. It is conceivable that this is because base sheet 4 in coated metal sheets 34 to 36, which contains a chromate-based anti-rust pigment in the undercoat coating film and of which plated steel sheet has been subjected to chromate anti-rust treatment, exhibits higher corrosion resistance than that of base sheet 3 in coated metal sheet 15 for a long period.

Also it is obvious from Table 6 and Table 7, it can be seen that the gloss adjusting agent has no substantially adverse influence on the flat portion-corrosion resistance of the coated metal sheet even if particles larger than 0.9T are contained, provided that the content of the particles is at least 2.5 vol % or less relative to the particles having 0.9T or less and that the particle diameter of the particles is 1.2 times (1.2T) or less the film thickness of the overcoat coating film. It is conceivable that this is because particles slightly larger than the film thickness T of the overcoat coating film are likely to be oriented such that their long diameter is along the direction in which the overcoat coating material is applied and, if in a small amount, will be sufficiently and continuously covered with the resin of the overcoat coating film for the intended use period.

The gloss adjusting agent may also contain large particles which may be detected in a position deviating from its particle size distribution (coarse particles), although in a small amount. It is conceivable that such coarse particles, as clear from Table 6, are exposed from the overcoat coating film in durable use to cause impairment in the flat portion-corrosion resistance of the coated metal sheet. However, when the overcoat coating material containing the above-described coarse particles is subjected to an appropriate pulverizing step, a coated metal sheet having sufficient flat portion-corrosion resistance can be obtained. It is conceivable that this is because the above-described coarse particles are finely pulverized in the overcoat coating material to a degree enough for the coated metal sheet to exhibit the intended portion-corrosion resistance.

This application is entitled to and claims the benefit of Japanese Patent Application 2014-164265 filed on Aug. 12, 2014, the disclosure of which including the specification, drawings and abstract is incorporated herein by reference in its entirety.

INDUSTRIAL APPLICABILITY

In the coated metal sheet according to the present invention, reduction in the corrosion resistance in the flat portion, attributable to exposure, collapse and fall-off of the gloss adjusting agent and exposure, cracking, collapse, and fall-off of the matting agent from the overcoat coating film, is prevented. Thus, a coated metal sheet that exhibits the intended appearance and corrosion resistance for a long period can be obtained, even if used in an exterior application for a long period. Accordingly, the present invention is expected to further prolong the life of coated metal sheets for exterior use and to further enhance its usage.

The invention claimed is:

1. A coated metal sheet comprising: a metal sheet, and an overcoat coating film disposed on the metal sheet, wherein the overcoat coating film is composed of fluorine resin, wherein the overcoat coating film further comprises a gloss adjusting agent which is particles having micropores and a matting agent which is primary particles,
wherein a content of the gloss adjusting agent in the overcoat coating film is from 0.01 to 15 vol %,
wherein a content of the matting agent in the overcoat coating film is from 0.01 to 15 vol % and
wherein the coated metal sheet satisfies the following equations:

$$D1_{97.5}/T \le 0.9$$

$$Ru \le 1.2T$$

$$R1 \ge 1.0$$

$$0.5 \le D2_{97.5}/T \le 7.0$$

$$3 \ge T \ge 40$$

wherein R1 (μm) is a number average particle diameter of the gloss adjusting agent, T (μm) is a film thickness of the overcoat coating film, $D1_{97.5}$ (μM) is a 97.5% particle diameter in an accumulated particle size distribution of the gloss adjusting agent based on the number of particles, $D2_{97.5}$ (μm) is a 97.5% particle diameter in an accumulated particle size distribution of the matting agent based on the number of particles, and Ru (μm) is an upper limit particle diameter in a number particle size distribution of the gloss adjusting agent.

2. The coated metal sheet according to claim 1, wherein the Ru is less than T.

3. The coated metal sheet according to claim 1, wherein the metal sheet has been subjected to non-chromate anti-rust treatment, and the coated metal sheet is chromate-free.

4. The coated metal sheet according to claim 1, wherein the metal sheet has been subjected to chromate anti-rust treatment.

5. The coated metal sheet according to claim 1, wherein the gloss adjusting agent is silica particles.

6. The coated metal sheet according to claim 1, further comprising an undercoat coating film between the metal sheet and the overcoat coating film.

7. The coated metal sheet according to claim 6, further comprising an intercoat coating film between the undercoat coating film and the overcoat coating film.

8. The coated metal sheet according to claim 1, wherein the overcoat coating film is composed of a resin component, as the main component, comprising polyvinylidene fluoride and acrylic resin.

9. The coated metal sheet according to claim 1, having a glossiness at 60° is 0.1 to 15.

10. The coated metal sheet according to claim 1, being a coated metal sheet for exterior use.

11. An exterior building material comprising the coated metal sheet according to claim 1.

12. A method for producing a coated metal sheet comprising a metal sheet and an overcoat coating film disposed on the metal sheet, comprising the steps of:
  applying an overcoat coating material containing a fluorine resin, a gloss adjusting agent, and a matting agent onto the metal sheet; and
  curing the coating film of the overcoat coating material to form the overcoat coating film;
wherein a content of the gloss adjusting agent in the overcoat coating film is from 0.01 to 15 vol %, and a content of the matting agent in the overcoat coating film is from 0.01 to 15 vol %,
wherein the gloss adjusting agent is particles having micropores, and the matting agent is primary particles, and
wherein the gloss adjusting agent and the matting agent which satisfy the following equations are employed:

$$D1_{97.5}/T \leq 0.9$$

$$Ru \leq 1.2T$$

$$R1 \geq 1.0$$

$$0.5 < D2_{97.5}/T < 7.0$$

$$03 \leq T \leq 40$$

wherein R1 (μm) is a number average particle diameter of the gloss adjusting agent, T (μm) is a film thickness of the overcoat coating film, $D1_{97.5}$ (μm) is a 97.5% particle diameter in an accumulated particle size distribution of the gloss adjusting agent based on the number of particles, $D2_{97.5}$ (μm) is a 97.5% particle diameter in an accumulated particle size distribution of the matting agent based on the number of particles, and Ru (μm) is an upper limit particle diameter in a number particle size distribution of the gloss adjusting agent.

13. The method for producing a coated metal sheet according to claim 12, wherein the overcoat coating material has been subjected to treatment for pulverizing the particles in the overcoat coating material.

* * * * *

UNITED STATES PATENT AND TRADEMARK OFFICE
CERTIFICATE OF CORRECTION

PATENT NO. : 10,370,554 B2
APPLICATION NO. : 15/503185
DATED : August 6, 2019
INVENTOR(S) : Taketo Hara et al.

Page 1 of 1

It is certified that error appears in the above-identified patent and that said Letters Patent is hereby corrected as shown below:

On the Title Page

1. In Item (71), under "Applicant" in Column 1, delete "NISSHIN STEEL CO., LTD. (Tokyo, JP)" and insert -- NIPPON STEEL NISSHIN CO., LTD. (Tokyo, JP) --. therefor.
2. In Item (73), under "Assignee" in Column 1, delete "NISSHIN STEEL CO., LTD. (Tokyo, JP)" and insert -- NIPPON STEEL NISSHIN CO., LTD. (Tokyo, JP) --. therefor.

Signed and Sealed this
Nineteenth Day of November, 2019

Andrei Iancu
*Director of the United States Patent and Trademark Office*